United States Patent [19]
Suzuki et al.

[11] Patent Number: 6,049,472
[45] Date of Patent: Apr. 11, 2000

[54] POWER FACTOR IMPROVING CIRCUIT

[75] Inventors: Yasunobu Suzuki, Tokyo; Toru Teshima, Yokohama, both of Japan

[73] Assignee: I-Hits Laboratory, Kanagawa, Japan

[21] Appl. No.: 09/035,089

[22] Filed: Mar. 5, 1998

[30] Foreign Application Priority Data

Mar. 6, 1997 [JP] Japan .................... 9-052096

[51] Int. Cl.[7] .................. H02M 5/45; H02M 1/12
[52] U.S. Cl. .................. 363/37; 363/40
[58] Field of Search .................. 363/37, 39, 44, 363/45, 46, 47, 82, 95, 98, 131, 132

[56] References Cited

U.S. PATENT DOCUMENTS

| | | | |
|---|---|---|---|
| 5,343,378 | 8/1994 | Tohya | 363/37 X |
| 5,541,829 | 7/1996 | Maehara et al. | 363/37 X |
| 5,825,639 | 10/1998 | Wagoner | 363/39 |

*Primary Examiner*—Y. J. Han
*Attorney, Agent, or Firm*—Wenderoth, Lind & Ponack, L.L.P.

[57] ABSTRACT

A power factor improving circuit for reducing a harmonic current component contained in an AC input current and for achieving an excellent power factor and efficiency in a circuit having a rectifier circuit, provided between a rectifier circuit and a half-bridge-type inverter, including a discharging diode and a smoothing capacitor connected in series to each other and in parallel between output terminals of the rectifier circuit, a charging half-bridge rectifier connected to the smoothing capacitor, and a high-frequency capacitor and high-frequency inductor connected in series to each other and between an input terminal of the charging half-bridge rectifier and a connecting point of two transistors of the half-bridge-type inverter.

22 Claims, 19 Drawing Sheets harmonic current harmonic current harmonic current

POWER FACTOR IMPROVING CIRCUIT

FIELD OF THE INVENTION

The present invention relates to a power factor improving circuit and, more particularly, to a novel circuit which reduces harmonic current contained in AC input current and provides an excellent efficiency and power factor.

PRIOR ART

Until now, generally, a switching power supply is widely used for electronic equipment such as video equipment, audio equipment, computers, and also for AC output equipment such as air conditioners, cooking machines, lighting apparatus, industrial motor controllers, and uninterruptible power supply units. The demand for such a switching power supply is rapidly increasing as electronic technology such as switching for semiconductors, proprietary LSI controller, and high-frequency magnetic materials and condensers improves.

However, a rectifier circuit such as a switching power supply requires a large input current value relative to the power consumption as represented by an input power factor of about 0.6 to 0.67. Thus, because of an increased reactive power in power supplying and distributing systems, it is pointed out that resource energy of the earth has been wasted.

Also, the harmonic current component contained in AC input current causes radio troubles or accidents in power receiving and distributing facilities, thus the harmonic current component is pointed out as a public nuisance in current supply systems.

FIG. 1 illustrates an example of a typical lighting circuit of a conventional inverter-type fluorescent lamp. In FIG. 1, 1a and 1b are AC input terminals, 2 is a high-frequency filter comprising a capacitor and an inductor, 3 is a single-phase bridge rectifier circuit comprising diodes D1, D2, D3 and D4, 4 is a half-bridge-type inverter, 5 is an electronic ballast, 6 is a fluorescent lamp, 7 is a starting capacitor, and 8 is a rush-current preventing circuit comprising a resistance and a triode AC switch. Further, a smoothing capacitor C1 is connected in parallel between output terminals of the single-phase bridge rectifier circuit 3.

In the lighting circuit shown in FIG. 1, firstly, a harmonic current component contained in AC input current entered from an AC power supply via AC input terminals 1a and 1b is removed by the high-frequency filter 2 and rectified into DC current by the single-phase bridge rectifier circuit 3. Secondly, the DC current is smoothed by the smoothing capacitor C1, converted into high-frequency AC current by the half-bridge-type inverter 4, and then impressed onto the fluorescent lamp 6 via the electronic ballast 5.

FIG. 2 schematically illustrates waveforms of AC input voltage e, AC input current $I_{ac}$, and terminal voltage $V_{c1}$, of the smoothing capacitor C1 in the conventional lighting circuit shown in FIG. 1. FIG. 3 illustrates an input current waveform and a high-order harmonic current component contained in this input current waveform in a lighting device of a commercially available inverter-type fluorescent lamp having the circuit configuration as shown in FIG. 1.

As is clear from the waveforms shown in FIGS. 2 and 3, AC input current $I_{ac}$ flows only near the maximum value of AC input voltage e and exhibits a large peak value. This indicates that the conventional circuit, as shown in FIG. 1, has a poor form factor and cannot sufficiently remove harmonic current by the high-frequency filter 2 alone, so that AC current containing a significant harmonic current component flows therethrough, resulting in a lower power factor.

As shown in FIG. 3, the input current waveform in an actual lighting device has an observed value of total harmonic distortion (THD) of 112.32%, and the power factor (PF) can be calculated using the following formula (1) with the THD value.

$$PF = \frac{1}{\sqrt{1^2 + (THD)^2}} \qquad (1)$$

$$= \frac{1}{\sqrt{1^2 + (1.1232)^2}}$$

The calculation gives a value of about 0.665, suggesting a very large reactive power.

Under such circumstances, regulation for the power factor and harmonic current in a circuit having a rectifier circuit have been set forth by the International Electrochemical Commission (IEC), and thus measures to cope with this international regulation are required.

As measures to be taken to be in conformity with the regulation set by the IEC, an active-filter type circuit and a choke-input type circuit has been proposed.

However, the conventional active-filter type circuit introduces a problem in that it comprises many circuit elements including a filter for inhibiting switching noise, thus leading to a higher cost. Further, the conventional choke-input type circuit has a problem in that, because of large volume and weight, it was difficult to obtain a sufficiently high power factor.

SUMMARY OF THE INVENTION

In view of the foregoing, it is the main object of the present invention to provide a novel and low-cost power factor improving circuit which reduces a harmonic current component contained in AC input current in a circuit having a rectifier circuit and provides an excellent power factor, with a simple circuit configuration.

BRIEF DESCRIPTION OF THE DRAWINGS

The foregoing objects, features and advantages of the present invention will be better understood from the following detailed description, taken in conjunction with the accompanying drawings, in which.

DETAILED DESCRIPTION OF THE INVENTION

Figure 4:
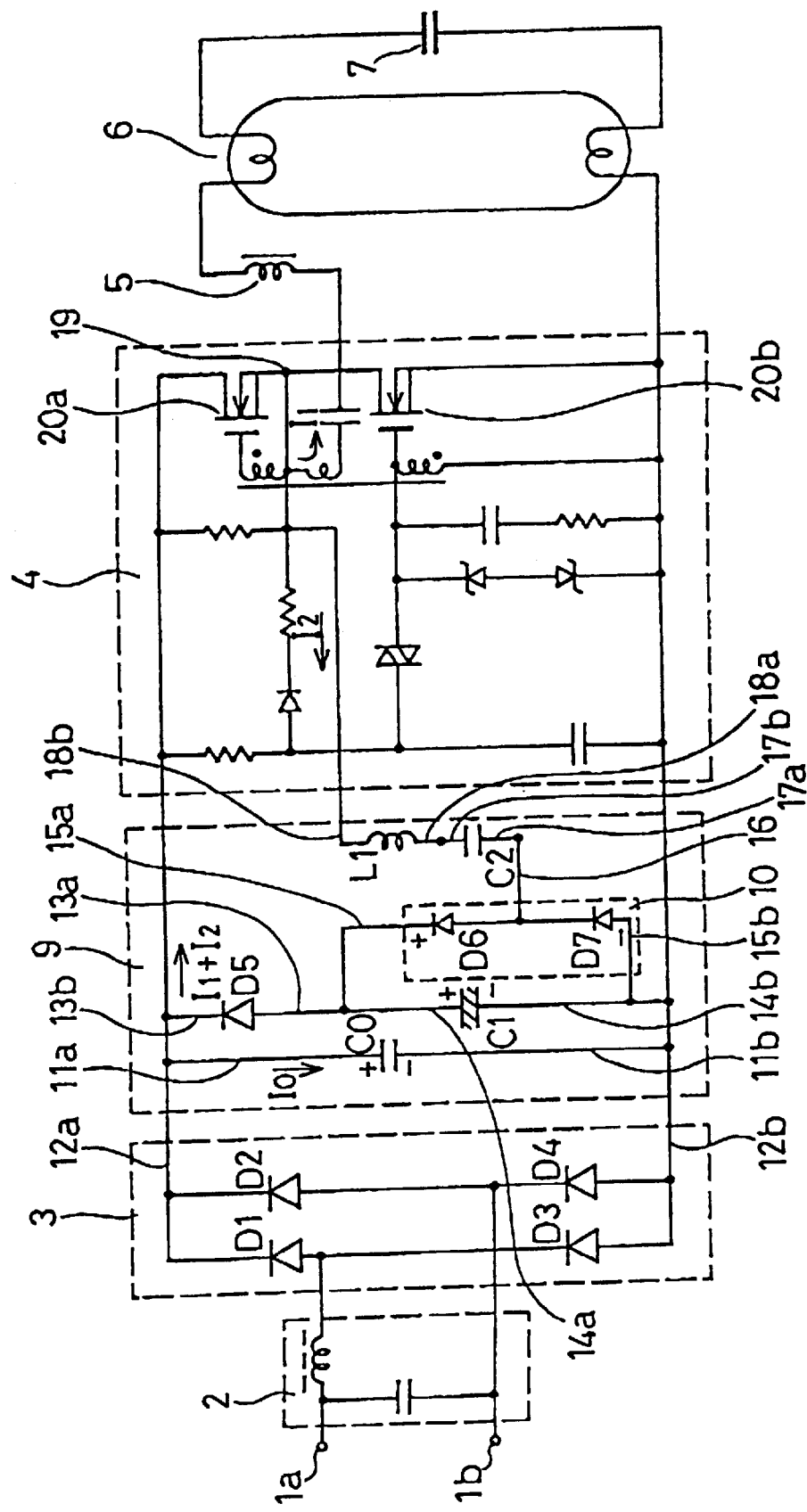
FIG. 4 is a circuit diagram illustrating an example of a lighting circuit of an inverter-type fluorescent lamp incorporating the power factor improving circuit of the present invention.

FIG. 4 illustrates an example of a lighting circuit of an inverter-type fluorescent lamp provided with the power factor improving circuit of the present invention.

In the lighting circuit of the inverter-type fluorescent lamp shown in FIG. 4, the power factor improving circuit 9 of the invention is provided between the output side of a single-phase bridge rectifier 3 comprising diodes D1, D2, D3 and D4 which converts AC voltage having been entered from AC input terminals 1a and 1b and passed through a high-frequency filter 2 into DC voltage, on the one hand, and a known half-bridge-type inverter 4 having two ON/OFF switch transistors 20a and 20b which converts DC voltage into high-frequency AC voltage, on the other hand. The other components are the same as those of the lighting circuit of the conventional inverter-type fluorescent lamp shown in FIG. 1 such that a fluorescent lamp 6 is connected to the outputs of the half-bridge-type inverter 4 with an electronic ballast 5 on one of the output lines connecting the fluorescent lamp 6 and the half-bridge-type inverter 4 and, a starting capacitor 7 is connected to the fluorescent lamp 6.

The power factor improving circuit 9 of the present invention comprises a discharging diode D5, a smoothing capacitor C1, a discharging half-bridge rectifier 10 comprising two diodes D6 and D7, a high-frequency capacitor C2, and a high-frequency choke coil L1, and added with a high-frequency bypass capacitor C0.

The discharging diode D5 and the smoothing capacitor C1 are connected in series such that an anode input terminal 13a of the discharging diode D5 and a plus pole terminal 14a of the smoothing capacitor C1 are connected to each other. Further, the discharging diode D5 and the smoothing capacitor C1 are connected together in parallel to the single-phase bridge rectifier circuit 3 with a cathode output terminal 13b of the discharging diode D5 and a minus pole terminal 14b of the smoothing capacitor C1 respectively connected to a plus output terminal 12a and a minus output terminal 12b of the single-phase bridge rectifier circuit 3.

A plus output terminal 15a of the charging half-bridge rectifier 10, i.e., an output terminal of the diode D6, is connected to the plus terminal 14a of the smoothing capacitor C1, and a minus output terminal 15b of the charging half-bridge rectifier 10, i.e., an input terminal of the diode D7, is connected to the minus pole terminal 14b of the smoothing capacitor C1.

Between an input terminal 16 of the charging half-bridge rectifier 10, i.e., a common terminal of the diodes D6 and D7, and a connecting point 19 of two ON/OFF switch transistors 20a and 20b in the half-bridge-type inverter 4, the high-frequency capacitor C2 and the high-frequency choke coil L1 are connected in series such that one terminal 17a of the high-frequency capacitor C2 is connected to the input terminal 16, and the other terminal 17b of the high-frequency capacitor C2 and one terminal 18a of the high-frequency choke coil L1 are connected to each other, and the other terminal 18b of the high-frequency choke coil L1 is connected to the connecting point 19.

Thus, there is formed a double-voltage rectifier circuit of a high-frequency AC voltage having input from the half-bridge-type inverter 4 and output to the smoothing capacitor C1 by the configuration of the high-frequency choke coil L1, the high-frequency capacitor C1 and the diodes D6 and D7, and there is also formed a partial smoothing circuit by the connection of the discharging diode D5 so as to ensure a flow toward the plus pole of the single-phase bridge rectifier circuit 3.

The high-frequency bypass capacitor C0 which absorbs high-frequency noise to prevent flow thereof onto the AC power supply side is connected in parallel to the single-phase bridge rectifier circuit 3 with its plus pole terminal 11a and minus pole terminal 11b connected to the plus output terminal 12a and the minus output terminal 12b, respectively, of the single-phase bridge rectifier circuit 3.

In the lighting circuit provided with the power factor improving circuit 9 of the invention having a circuit configuration as described above, during a power-on of the AC power supply, the smoothing capacitor C1 is not charged by the discharging diode D5, and only the high-frequency bypass capacitor C0 is charged. The half-bridge-type inverter 4 starts oscillation by the voltage charged in this high-frequency bypass capacitor C0, and the smoothing capacitor C1 is charged via the high-frequency choke coil L1, the high-frequency capacitor C2 and the diodes D6 and D7 of the charging half-bridge rectifier 10, i.e., via the high-frequency double-voltage rectifier circuit, only for a period $T_1$, i.e., only for a period during which the DC output voltage available through full-wave rectification by the single-phase bridge rectifier circuit 3 is higher than the terminal voltage $V_{c1}$ of the smoothing capacitor C1.

The charging voltage of this smoothing capacitor C1, i.e., the terminal voltage $V_{c1}$ thereof, varies with the value of inductance of the high-frequency capacitor C2 and the high-frequency choke coil L1. For example, when the inductance value of the high-frequency capacitor C2 is small and the inductance value of the high-frequency choke coil L1 is large, the charging voltage becomes lower. When an appropriate value of impedance is selected, the charging voltage is increased to about 85% of the maximum value of DC output voltage.

By using a capacitor and a choke coil having a serial resonance frequency equal to or close to the oscillation frequency of the half-bridge-type inverter 4 as the high-frequency capacitor C2 and the high-frequency choke coil L1, it is possible to perform charging of the smoothing capacitor C1 more efficiently.

Figure 5:
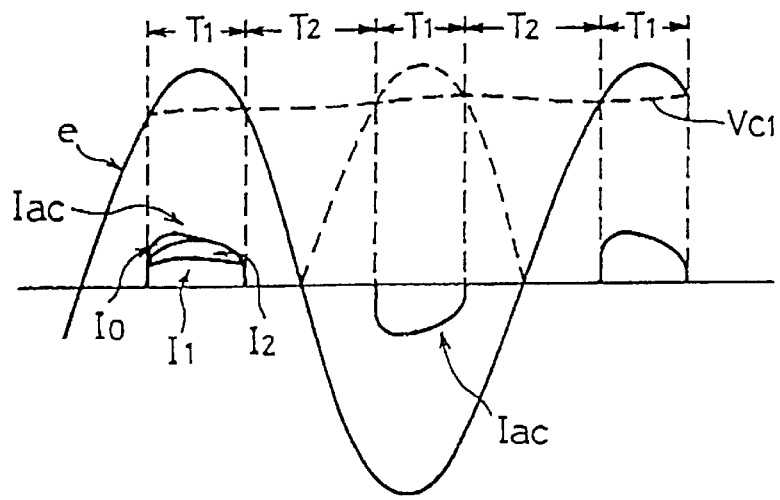
FIG. 5 is a schematic graph illustrating waveforms of AC input voltage e, AC input current $I_{ac}$, and terminal voltage $V_{c1}$ of a smoothing capacitor C1 in the circuit shown in FIG. 4.

During the period $T_2$ shown in FIG. 5, after the lapse of the period $T_1$, the charging voltage $V_{c1}$ of the charged smoothing capacitor C1 becomes higher than the instantaneous value of DC output voltage of the single-phase bridge rectifier 4. The accumulated energy in the smoothing capacitor C1 is therefore supplied to the half-bridge-type inverter 4 via the discharging diode D5. During this period $T_2$, no current flows into the single-phase bridge rectifier circuit 3.

That is, the AC input current $I_{ac}$ flows only during the period $T_1$, forming a resultant current by the addition of current $I_1$ to the half-bridge-type inverter 4, charging current $I_2$ to the smoothing capacitor C1 and current $I_0$, to the high-frequency bypass capacitor C0, and takes a waveform as shown in FIG. 5.

Figure 6:
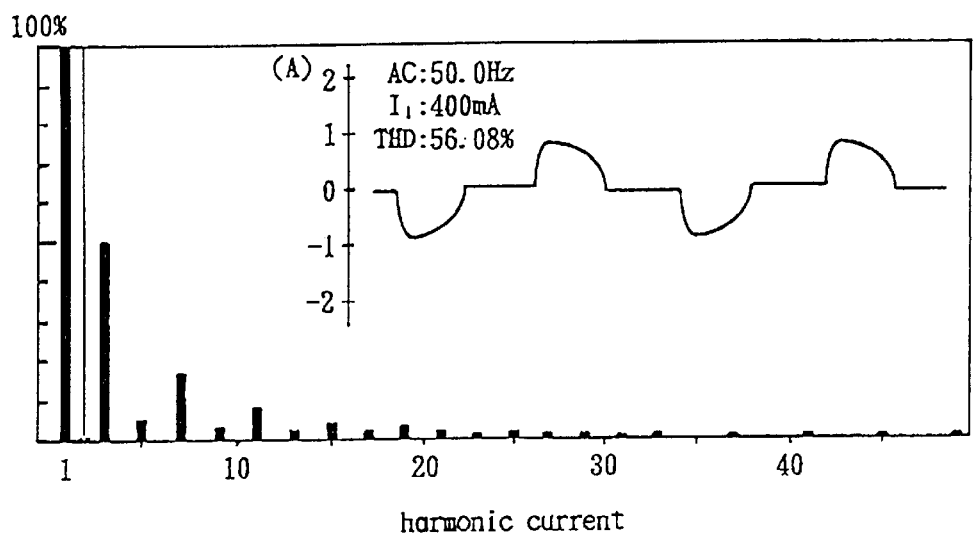
FIG. 6 is a graph illustrating an AC input current waveform and a harmonic current component contained in this AC input current waveform in the circuit shown in FIG. 4.

FIG. 6 illustrates an observed waveform of AC input current in the circuit shown in FIG. 4 and a harmonic current component contained in AC input current.

Figure 1:
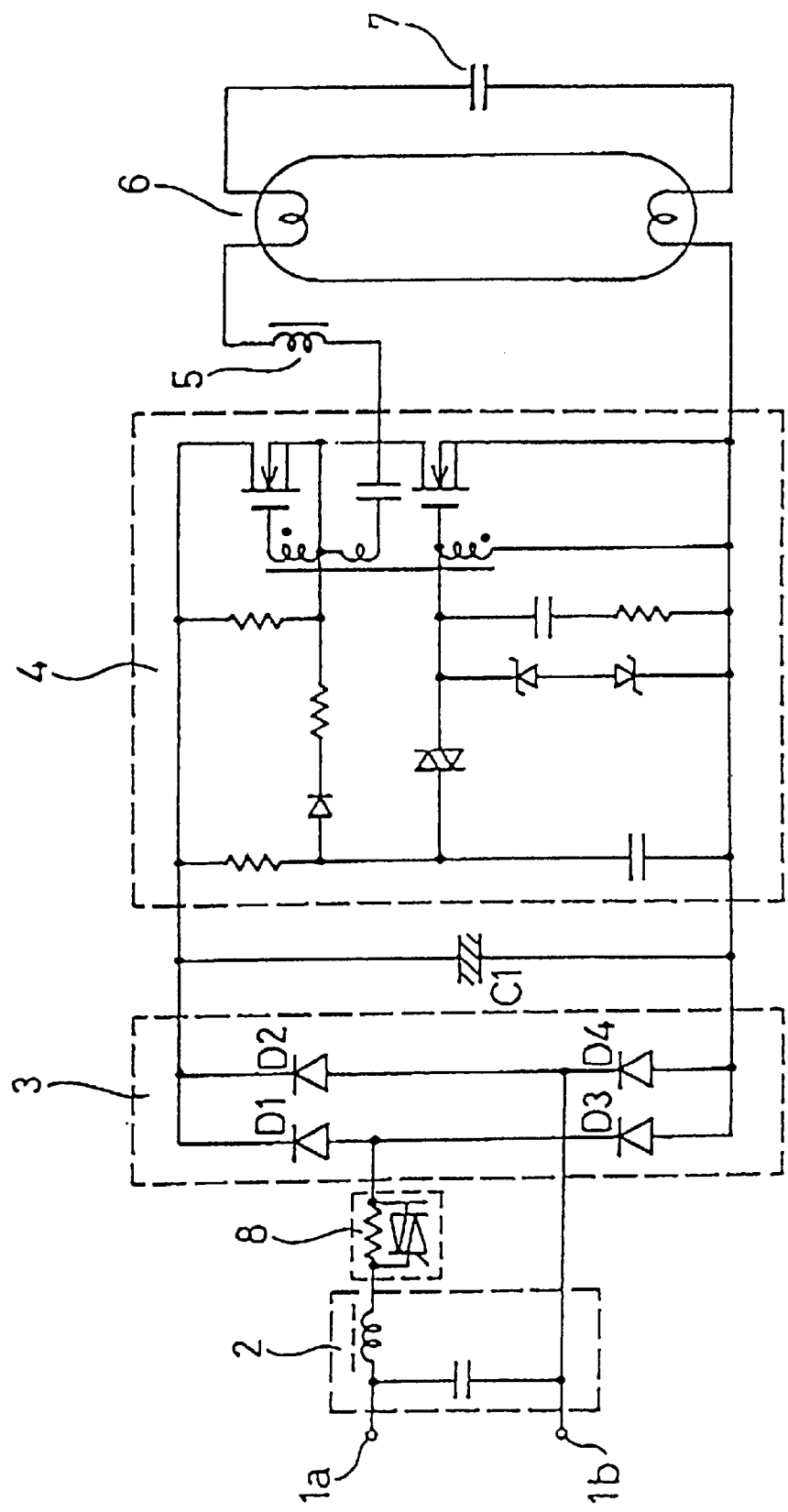
FIG. 1 is a circuit diagram illustrating a lighting circuit of a conventional inverter-type fluorescent lamp.
Figure 2:
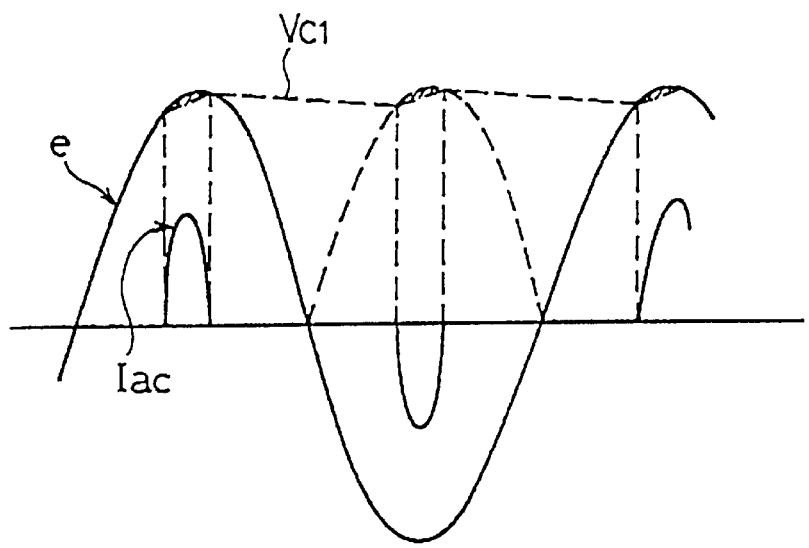
FIG. 2 is a schematic graph illustrating waveforms of AC input voltage e, AC input current $I_{ac}$, and terminal voltage $V_{c1}$ of a smoothing capacitor C1 in the lighting circuit shown in FIG. 1.
Figure 3:
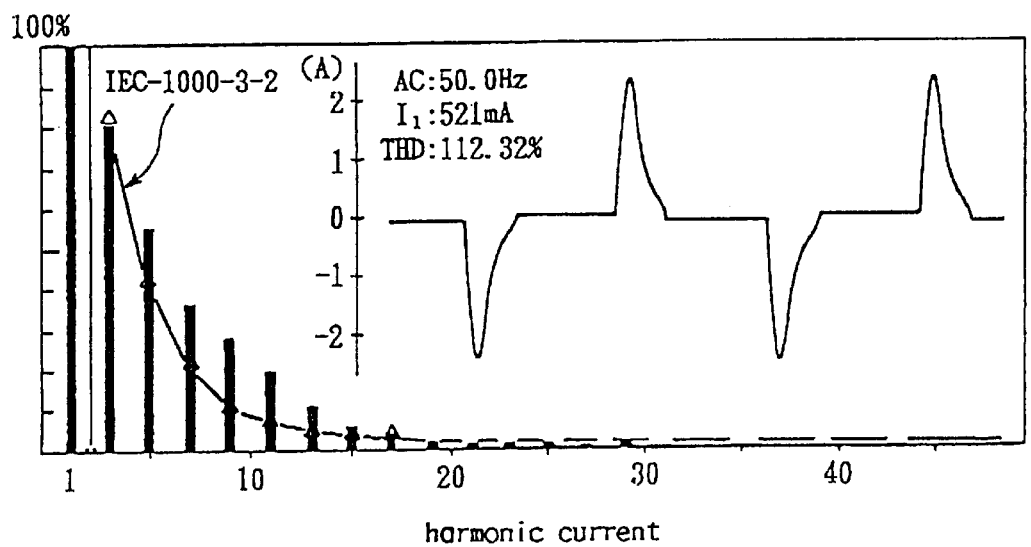
FIG. 3 is a graph illustrating an AC input current waveform and a harmonic current component contained in this AC input current waveform in a lighting circuit of a conventional inverter-type fluorescent lamp having the circuit configuration as shown in FIG. 1.

As shown in FIG. 6, AC input current has a waveform similar to the current waveform shown in FIG. 5, and the harmonic current component of the AC input current is largely reduced as compared with the harmonic current component of AC input current in the conventional circuit shown in FIG. 1, as represented by a total harmonic distortion THD reduced to a half into 56.08%.

The power factor PF in the lighting circuit of FIG. 4 is calculated by the following formula;

$$PF = \frac{1}{\sqrt{1^2 + (THD)^2}} \quad (2)$$

$$= \frac{1}{\sqrt{1^2 + (0.56)^2}}$$

to be about 0.873, which shows an improvement of power factor of more than 20% relative to the power factor of 0.665 in the conventional circuit shown in FIG. 1.

According to the power factor improving circuit 9 of the present invention, as described above, it is possible to achieve a high power factor through a considerable improvement of the power factor of the lighting circuit of an inverter-type fluorescent lamp having a single-phase bridge rectifier circuit 3 by only adding a few elements between the known single-phase bridge rectifier circuit 3 and the half-bridge-type inverter 4.

Furthermore, in the conventional circuit shown in FIG. 1, charging current several tens of times as large as the rated value, i.e., a rush current flows for the smoothing capacitor C1 upon power-on. Consequently, when a device having a power of at least several tens of watts is connected as a load, it is necessary to connect a rush-current preventing circuit 8 which, in order to prevent such a rush current, comprises a resistance and a triode AC switch. By using a lighting circuit incorporating the power factor improving circuit 9 of the present invention, in which a current two to three circuit times as large as the rated current continues only for several cycles, it is not necessary to add such a rush-current preventing circuit, resulting in a more compact and less expensive circuit which is lighter in weight and has a smaller power loss than the conventional lighting circuit.

Figure 7:
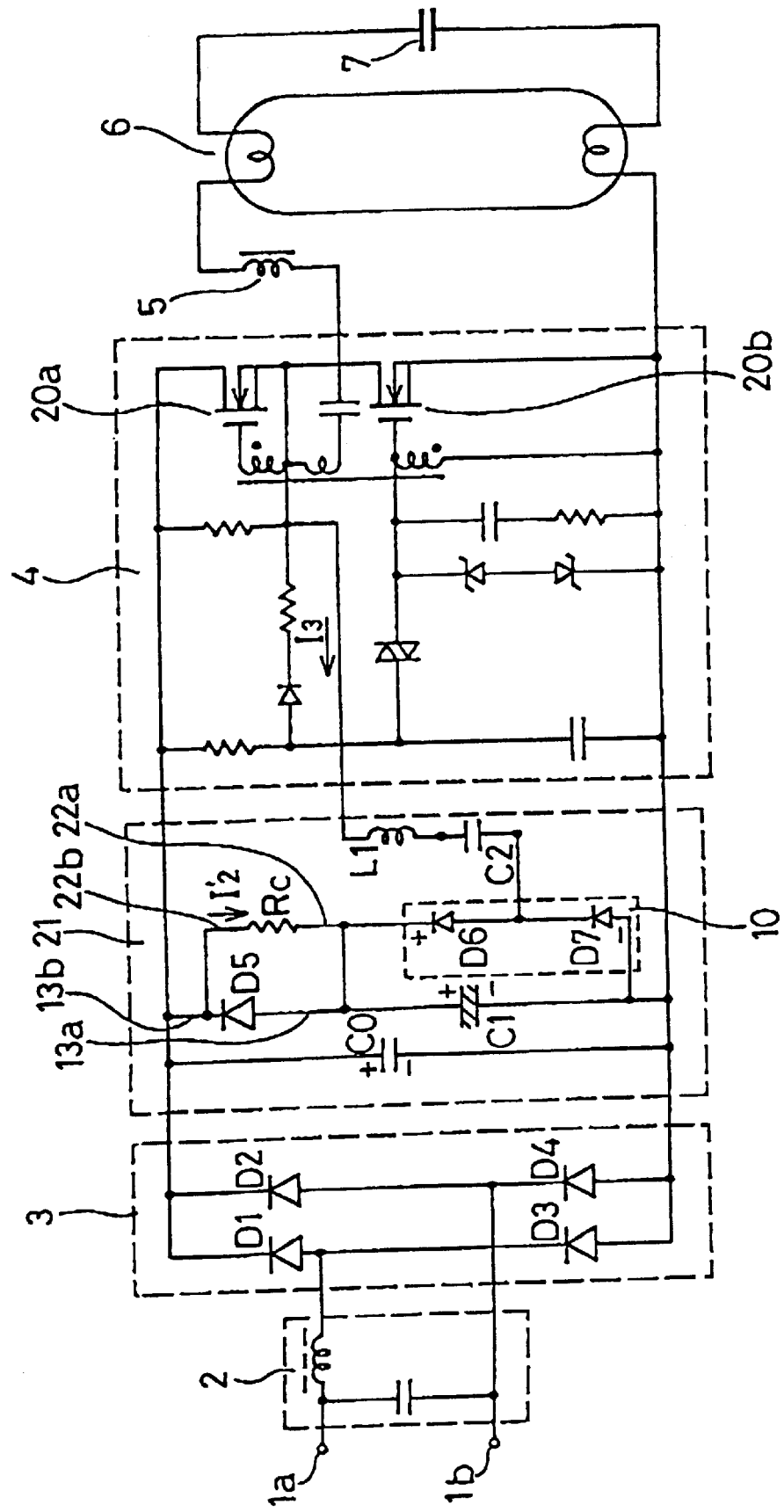
FIG. 7 is a circuit diagram illustrating another example of a lighting circuit of an inverter-type fluorescent lamp incorporating the power factor improving circuit of the present invention.

FIG. 7 illustrates a lighting circuit of an inverter-type fluorescent lamp incorporating another embodiment of the power factor improving circuit of the present invention.

The power factor improving circuit 21 of the invention has the same circuit configuration as the power factor improving circuit 9 of the invention shown in FIG. 4, except for a charging resistance Rc connected in parallel to the discharging diode D5. Terminals 22a and 22b of the charging resistance Rc are connected to an anode input terminal 11a and a cathode output terminal 13b of the discharging diode D5, respectively. The other components are the same as in the lighting circuit shown in FIG. 4.

By the addition of the charging resistance Rc in parallel to the discharging diode D5, as described above, $I_{2'}$ which is a part of the charging current $I_2$ necessary for charging the smoothing capacitor C1 flows through the charging resistance Rc to the smoothing capacitor C1. The high frequency current $I_3$ supplied from the half-bridge-type inverter 4 is therefore calculated by the following formula (3):

$$I_3 = I_2 - I_{3'} \quad (3)$$

Accordingly, it is possible to reduce the charging current $I_2$ by an amount equal to the charging current $I_{2'}$ which flows through the charging resistance Rc, and thus it is possible to prevent a decrease in efficiency caused by a heat generation of the ON/OFF switch transistors 20a and 20b in the half-bridge-type inverter 4. Because the charging resistance Rc operates only during the charging of the smoothing capacitor C1 and the discharging diode D5 operates during the discharging, no loss is caused.

Figure 8:
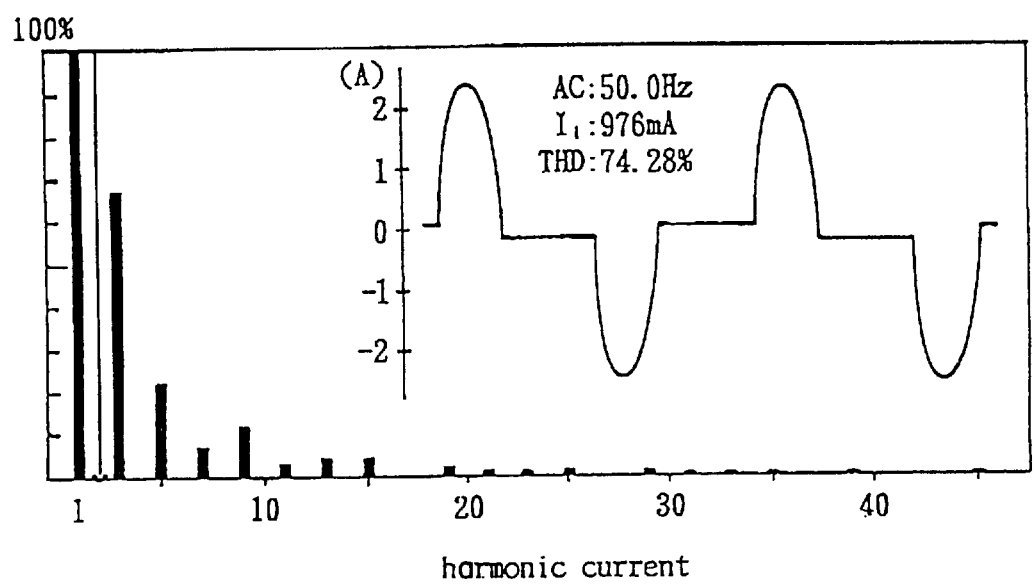
FIG. 8 is a graph illustrating an AC input current waveform and a harmonic current component contained in this AC input current waveform when connecting a fluorescent lamp of an input power of about 78 W in the circuit shown in FIG. 7.

FIG. 8 illustrates an AC input current waveform and a harmonic current component when connecting an inverter-type fluorescent lamp 6 of an input power of about 78 W.

As is clear from FIG. 8, the harmonic current component satisfies the regulation value of the IEC (IEC-1000-3-2), with a total harmonic distortion of 74.28%, resulting in a power factor of about 0.8. Accordingly, the power factor improving circuit 21 of the invention prevents a decrease in efficiency and allows a large improvement of the power factor.

It is needless to mention that it is possible to achieve a more excellent power factor by appropriately selecting values for the charging resistance Rc, the high-frequency capacitor C2 and the high-frequency choke coil L.

Figure 9:
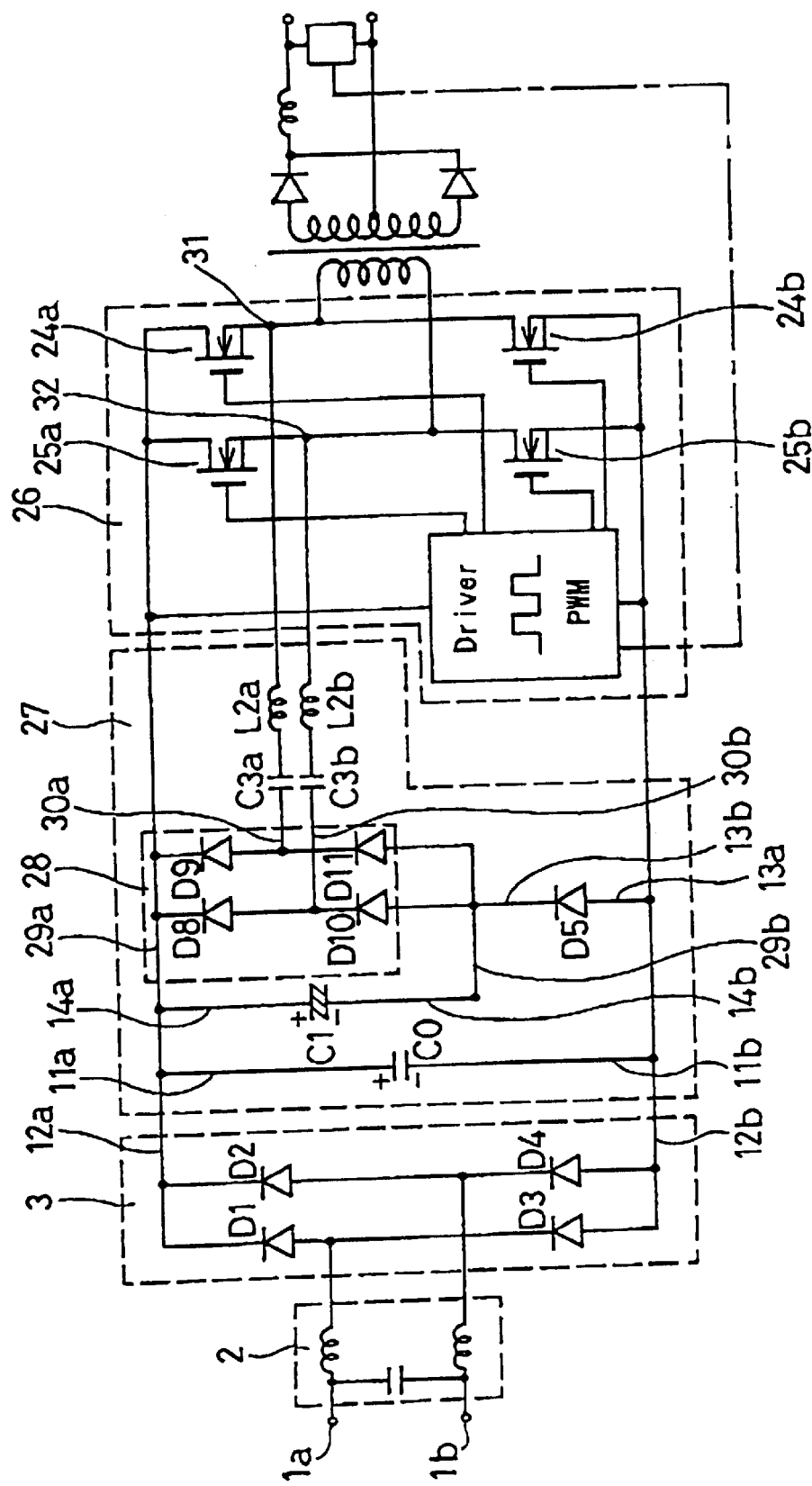
FIG. 9 is a circuit diagram illustrating an example of a DC-DC converter provided with a power factor improving circuit of the present invention.

FIG. 9 illustrates a DC-DC converter provided with a power factor improving circuit of the present invention.

In the DC-DC converter shown in FIG. 9, the power factor improving circuit 27 of the invention is provided between the output side of the single-phase bridge rectifier circuit 3, on the one hand, and the known bridge-type inverter 26 having two sets of ON/OFF switch transistors 24a/24b and 25a/25b. The bridge-type inverter 26 has a relatively high output of over several hundreds of Watts.

The power factor improving circuit 27 of the invention comprises a discharging diode D5, a smoothing capacitor C1, a charging bridge rectifier 28 comprising diodes D8, D9, D10 and D11, high-frequency capacitors C3a and C3b, high-frequency inductors L2a and L2b, and a high-frequency bypass capacitor C0 for absorbing high-frequency noise to prevent the same from flowing onto the AC power supply side.

More specifically, a plus pole terminal 14a of the smoothing capacitor C1 and a plus output terminal 29a of the charging bridge rectifier 28 are common-connected to one output terminal 12a of the single-phase bridge rectifier circuit 3. A minus pole terminal 14b of the smoothing capacitor C1, a minus output terminal 29b of the charging bridge rectifier 28, and a cathode output terminal 13b of the discharging diode D5 are common-connected, and an anode terminal 13a of the discharging diode D5 is connected to the other minus output terminal 12b of the single-phase bridge rectifier circuit 3.

High-frequency capacitors C3a and C3b are connected in series to input terminals 30a and 30b of the charging bridge rectifier 28, respectively, and high-frequency choke coils L2a and L2b are connected to these high-frequency capacitors C3a and C3b, respectively. Further, these high frequency choke coils L2a and L2b are connected to connecting points of the two sets of ON/OFF switch transistors in the bridge-type inverter 26, i.e., to a connecting point 31 of one set of the ON/OFF switch transistors 24a and 24b and a connecting point 32 of another set of the ON/OFF switch transistors 25a and 25b.

The high-frequency bypass capacitor C0 is connected in parallel to the single-phase bridge rectifier circuit 3, and a plus terminal 11a and a minus terminal 11b are connected to a plus output terminal 12a and a minus output terminal 12b of the single-phase bridge rectifier circuit 3, respectively.

In the DC-DC converter provided with the power factor improving circuit 27 of the invention having a circuit configuration described above, operations similar to those of the power factor improving circuit 9 in the lighting circuit of the inverter-type fluorescent lamp shown in FIG. 4 are carried out.

The power factor improving circuit 9 shown in FIG. 4 is suitable for improving the power factor of a circuit to which a load of a relatively small output is connected. The power factor improving circuit 27 shown in FIG. 9 is suitable, on the other hand, for remarkably improving the power factor of a circuit to which a high-output load is connected.

It is needless to mention that the power factor improving circuit 27 shown in FIG. 9 may have a charging resistance connected in parallel to the discharging diode D5. In this case, as in the case of the power factor improving circuit 21 in the lighting circuit shown in FIG. 7, the charging current of the smoothing capacitor C1 is reduced by an amount equal to the current flowing through the charging resistance. Thus, the power factor improving circuit 27 of the present invention prevents a decrease in efficiency caused by heat generation of the ON/OFF switch transistors in the bridge-type inverter 26, and largely improves power factor.

Figure 10:
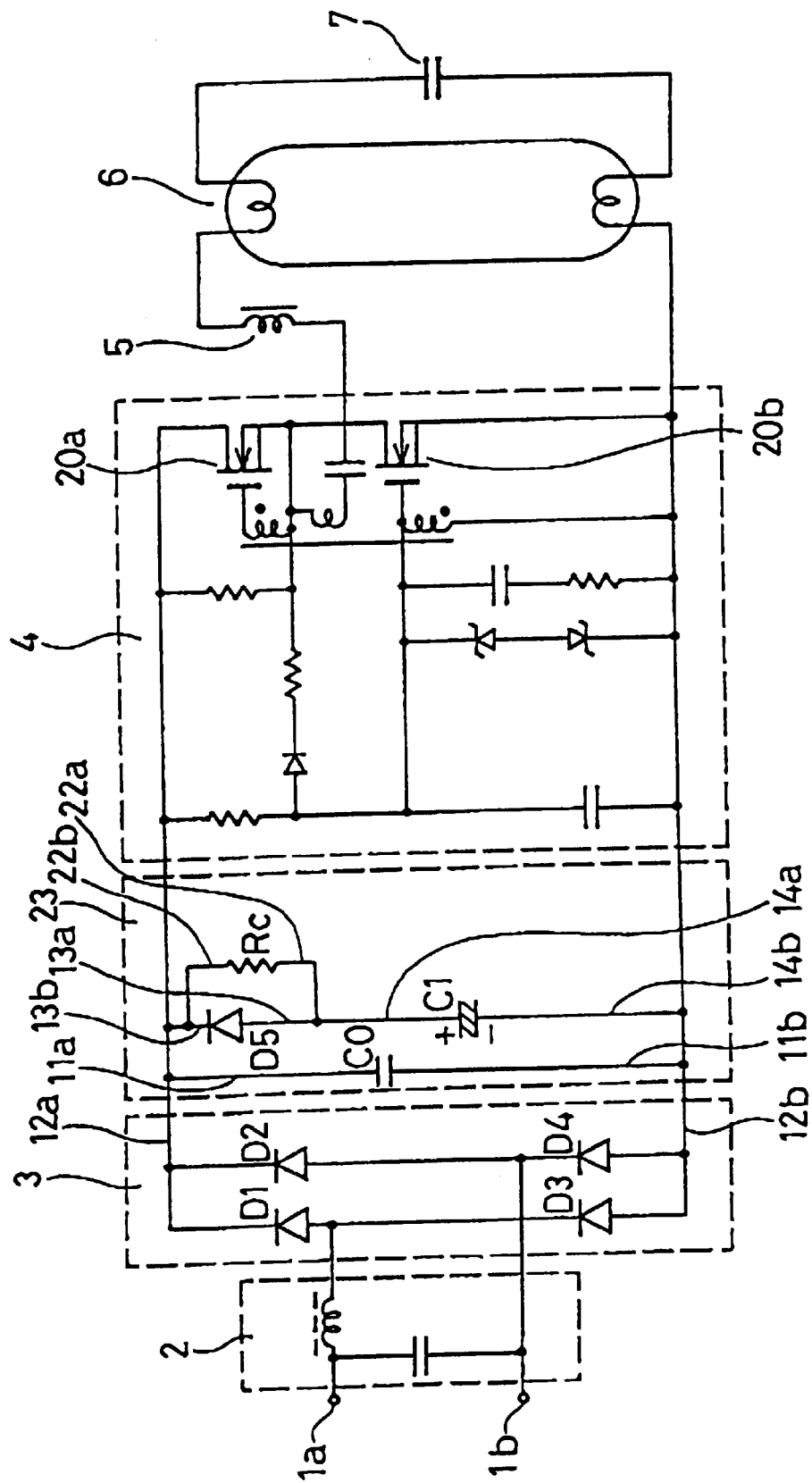
FIG. 10 is a circuit diagram illustrating another example of a lighting circuit of an inverter-type fluorescent lamp incorporating the power factor improving circuit of the present invention.

FIG. 10 illustrates another example of the power factor improving circuit of the present invention used in a lighting circuit of an inverter-type fluorescent lamp.

In the lighting circuit of the inverter-type fluorescent lamp shown in FIG. 10, the power factor improving circuit 23 of the invention comprising a discharging diode D5, a smoothing capacitor C1, and a charging resistance Rc is provided on the output side of a single-phase bridge rectifier circuit 3. Furthermore, a half-bridge-type inverter 4 and a fluorescent lamp 6 as a load are connected to the output side of this power factor improving circuit 23. The other components are the same as in the lighting circuit of the conventional inverter-type fluorescent lamp shown in FIG. 1.

In the power factor improving circuit 23 of the invention, the discharging diode D5 and the smoothing capacitor C1 are connected in series through connection of an anode input terminal 13a of the discharging diode D5 with a plus pole terminal 14a of the smoothing capacitor C1, and they are connected in parallel to the single-phase bridge rectifier circuit 3, in which a cathode output terminal 13b of the discharging diode D5 and a minus pole terminal 14b of the smoothing capacitor C1 are connected to a plus output terminal 12a and a minus output terminal 12b of the single-phase bridge rectifier circuit 3, respectively.

The discharging diode D5 is connected so as to ensure flow toward a plus pole of the single-phase bridge rectifier circuit 3 and so as to form a partial smoothing circuit.

The charging resistance Rc is connected in parallel to the discharging diode D5 such that one terminal 22a is connected to a serial-connection common terminal of the discharging diode D5 and the smoothing capacitor C1, i.e., an anode input terminal 13a of the discharging diode D5 or a plus terminal 14a of the smoothing capacitor C1, and the other terminal 22b is connected to a cathode output terminal 13b of the discharging diode D5.

Further, the high-frequency bypass capacitor C0 is connected in parallel between the output terminals 12a and 12b of the single-phase bridge rectifier circuit 3.

Figure 11:
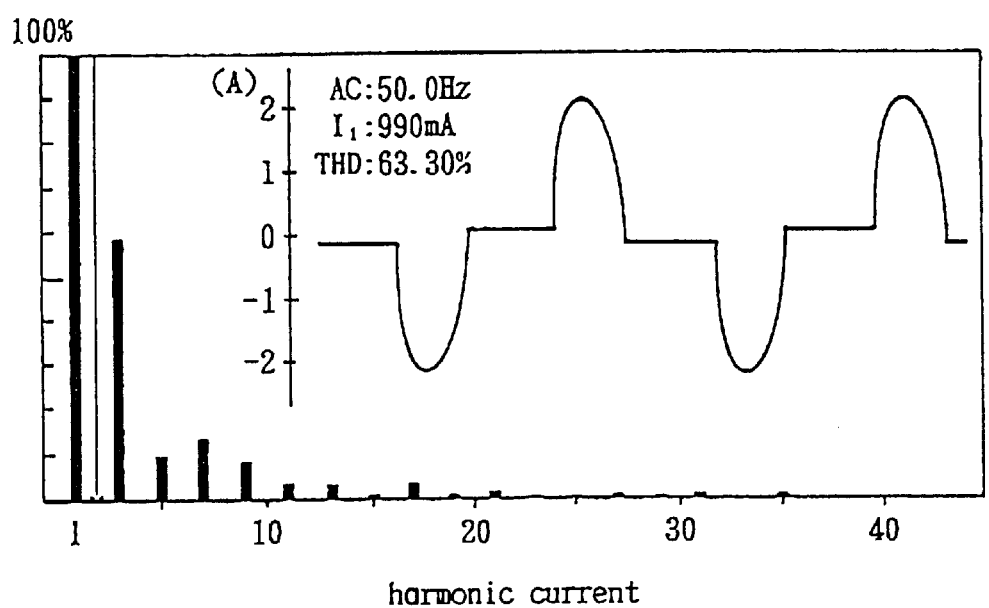
FIG. 11 is a graph illustrating an AC input current waveform and a harmonic current component contained in this AC input current waveform when connecting a fluorescent lamp of an input power of about 85 W in the circuit shown in FIG. 10.

In the lighting circuit of the inverter-type fluorescent lamp provided with the power factor improving circuit 23 of the invention having a circuit configuration described above, when a fluorescent lamp 6 of an input power of about 85 W is turned on, as shown in FIG. 11, there is obtained a total harmonic distortion THD of 63.30%, resulting in a power factor of 0.845. And, the harmonic current component satisfies the value set forth in IEC-1000-3-2.

In the lighting circuit shown in FIG. 10, since the rush current caused by a charging of the smoothing capacitor C1, upon power-on, is limited by the charging resistance Rc, a rush current preventing circuit 8 as shown in FIG. 1 is not necessary. Thus, by only adding the high-frequency bypass capacitor C0, the discharging diode D5, and the charging resistance Rc, it is possible to considerably improve the power factor.

Even when the power factor improving circuit 23 of the invention is provided as in the lighting circuit shown in FIG.

10, the decrease in efficiency is smaller than the decrease in efficiency through an active filter in the conventional active filter circuit as described above, thus permitting maintenance of a very excellent efficiency.

Figure 12:
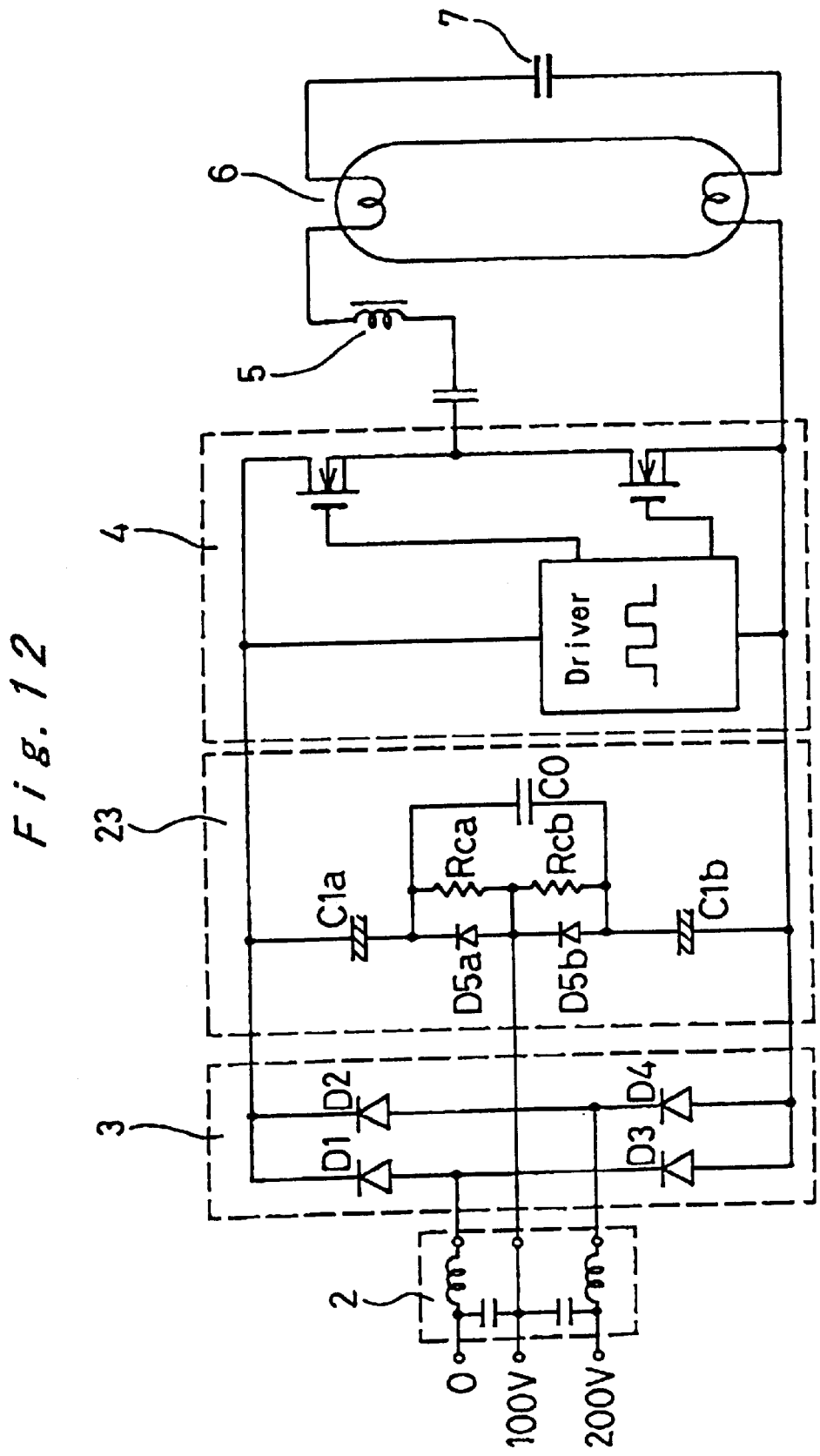
FIG. 12 is a circuit diagram illustrating an example of an application where the power factor improving circuit of the invention shown in FIG. 10 is shared by an input voltage 100-V and 200-V system of the lighting circuit.

FIG. 12 illustrates an example of an application where the power factor improving circuit of the invention is shared by an input voltage 100-V and 200-V system of the lighting circuit shown in FIG. 10.

The power factor improving circuit 23 in the lighting circuit shown in FIG. 12 is a double-voltage rectifier circuit provided with two power factor improving circuits 23 shown in FIG. 10 for lighting a fluorescent lamp 6 of about 62 W to 102 W wherein two discharging diodes D5a and D5b, two smoothing capacitors C1a and C1b, two charging resistances Rca and Rcb, and a high frequency bypass capacitor C0 are respectively connected.

An anode of the discharging diode D5a and a cathode of the discharging diode D5b are connected to each other, the smoothing capacitor C1a is connected in series to a cathode of the discharging diode D5a, and the smoothing capacitor C1b is connected in series to an anode of the discharging diode D5b. The charging resistances Rca and Rcb are mutually connected in series, and the serial connecting point thereof is connected to a serial connecting point of the discharging diodes D5a and D5b, these being connected in parallel to the discharging diodes D5a and D5b, respectively. The high-frequency bypass capacitor C0 is connected in parallel to these charging resistances.

Only one high-frequency bypass capacitor C0 is provided to reduce the number of elements, and this capacitor C0 has a dielectric strength which is twice as high as that used in the case of using two capacitors. The high-frequency bypass capacitor C0 may be connected in parallel between output terminals of the single-phase bridge rectifier circuit 3.

The charging resistance Rc, as well, may be reduced to one by disconnecting the connecting terminal between the connecting point of the two charging resistances Rca and Rcb and the connecting point of the two discharging diodes D5a and D5b.

The power factor improving circuit 23 shared by 100-V and 200-V systems of input voltage also improves the power factor in a circuit having a rectifier circuit as in the power factor improving circuit shown on FIG. 10, and provides an efficiency and a light emitting ability similar thereto. In addition, an occurrence of switching noise onto the AC power supply side is less frequent.

Figure 13:
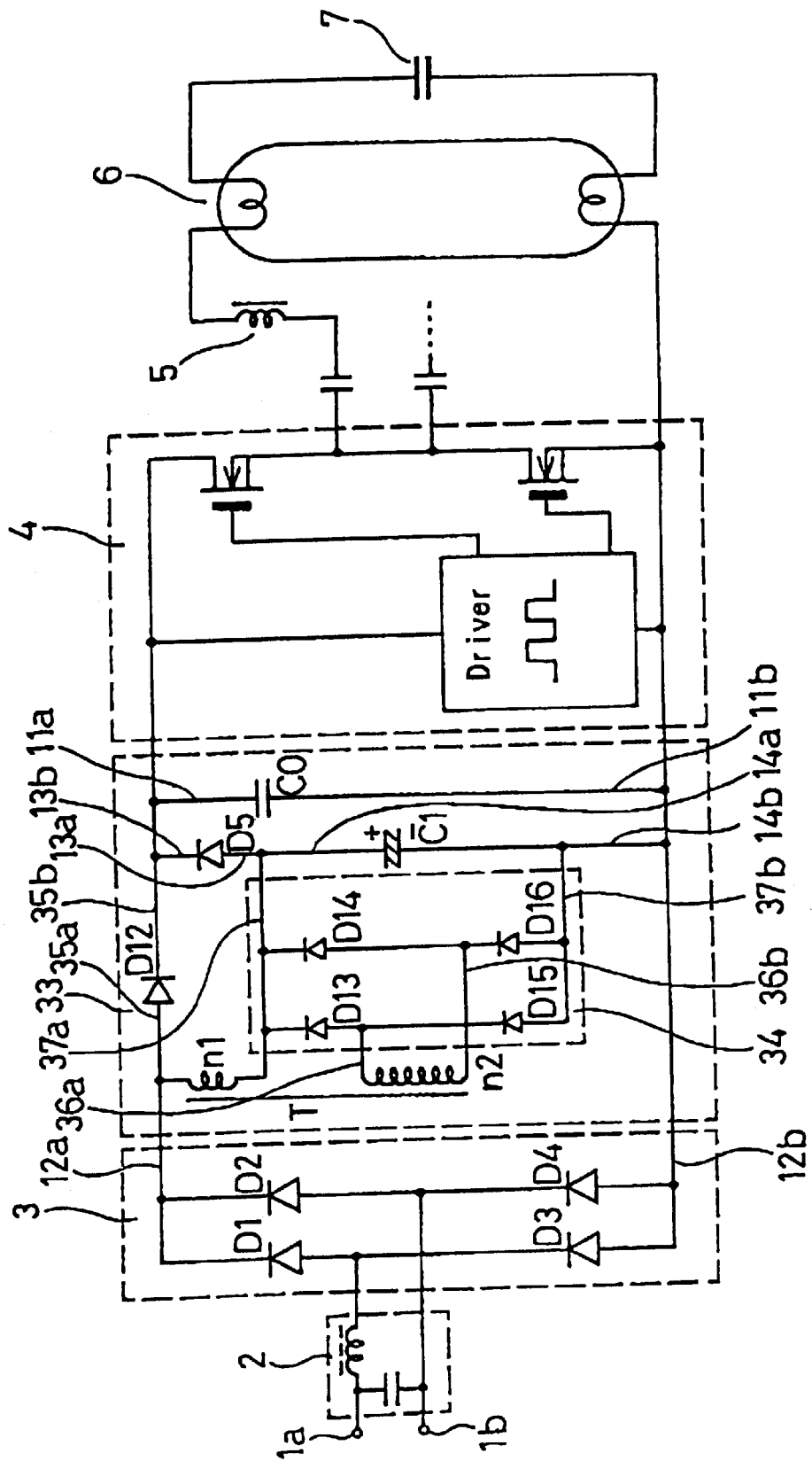
FIG. 13 is a circuit diagram illustrating another example of a lighting circuit of an inverter-type fluorescent lamp provided with the power factor improving circuit of the present invention.

FIG. 13 illustrates another example of a lighting circuit of an inverter type fluorescent lamp provided with the power factor improving circuit of the invention.

In the lighting circuit of the inverter-type fluorescent lamp shown in FIG. 13, the power factor improving circuit 33 of the invention is provided on the output side of a single-phase bridge rectifier circuit 3 comprising diodes D1, D2, D3 and D4, and comprises a transformer T comprising a primary winding ni and a secondary winding n2, an auxiliary charging single-phase bridge rectifier 34 comprising diodes D13, D14, D15 and D16, a discharging diode D5, a diode D12, a smoothing capacitor C1, and with further a high-frequency bypass capacitor C0.

More specifically, a minus pole terminal 14b of the smoothing capacitor C1 and a minus output terminal 12b of the single-phase bridge rectifier circuit 3 are connected to each other, and the primary winding n1 of the transformer T is connected between a plus terminal 14a of the smoothing capacitor C1 and a plus output terminal 12a of the single-phase bridge rectifier circuit 3.

The discharging diode D5 and the diode D12 are connected in series, a cathode 13b and a cathode 35b thereof are connected mutually, and they are connected in parallel to the primary winding n1 of the transformer T.

On the other hand, the AC input terminals 36a and 36b of the auxiliary charging single-phase bridge rectifier 34 are connected to the secondary winding n2 of the transformer T. A plus DC output terminal 37a and a minus output terminal 37b of the auxiliary charging single-phase bridge rectifier 34 are connected to the plus pole terminal 14a and the minus pole terminal 14b of the smoothing capacitor C1, respectively.

The high-frequency bypass capacitor C0 is connected in parallel to the single-phase bridge rectifier circuit 3, and one terminal 11a and another terminal 11b of the high-frequency bypass capacitor C0 are connected to a cathode 13b of the discharging diode D5 and a minus pole terminal 14b of the smoothing capacitor C1, respectively.

In this power factor improving circuit 33 of the invention shown in FIG. 13, the primary winding n1 and the secondary winding n2 of the transformer T are connected as described above. An output from the secondary winding n2 is rectified by the auxiliary single-phase bridge rectifier 34, and then the DC output power therefrom charges the smoothing capacitor C1 complementarily. A main charging of the smoothing capacitor C1 is accomplished via the primary winding n1.

Accordingly, power loss comprises only a core loss in the primary winding n1 and the secondary winding n2 of the transformer T, and a loss caused by the diodes D13, D14, D15 and D16 in the auxiliary charging single-phase bridge rectifier 34, and thus, the efficiency for the circuit as a whole is improved by about 3% as compared with the circuits shown in FIGS. 10 and 11.

The power factor improving circuit 33 shown in FIG. 13 is suitable for improving a power factor of an appliance giving an output power of at least 100 W.

Although the diode D12 suffers from power loss because of the flow of current from the single-phase bridge rectifier 3, it is possible to further improve an efficiency of the circuit as a whole since there is available a more remarkable effect of sufficiently taking out energy on the secondary winding n2 side of the transformer T and an auxiliary charging of the smoothing capacitor C1.

Figure 14:
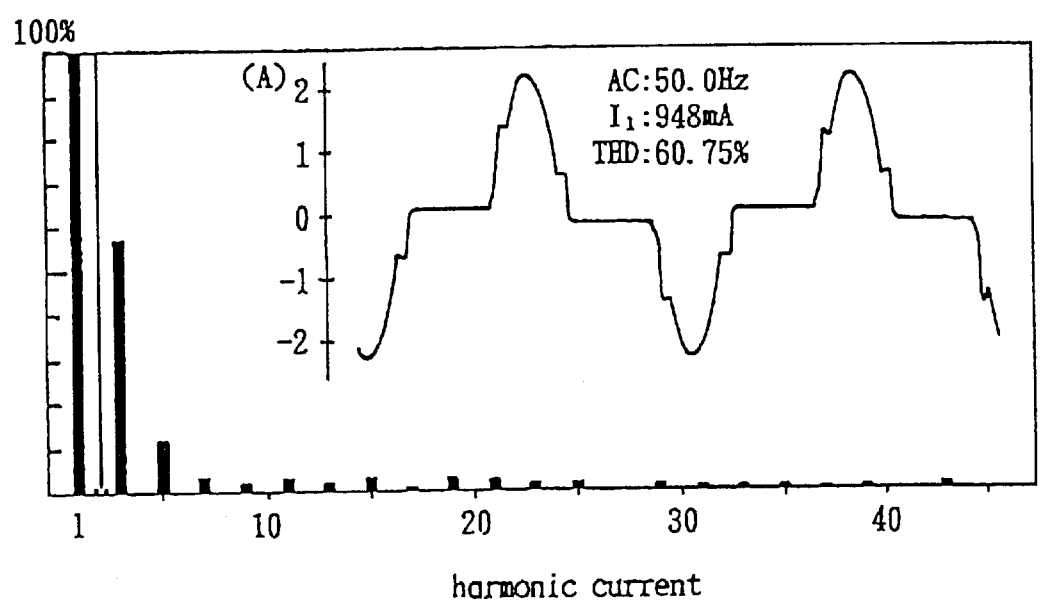
FIG. 14 is a graph illustrating an AC input current waveforn and a harmonic current component contained in this AC input current waveform when connecting a fluorescent lamp of an input power of about 82 W in the circuit shown in FIG. 13.

When using a fluorescent lamp 6 of an input power of about 82 W in the lighting circuit shown in FIG. 13, as shown in FIG. 14, a power factor of 0.86 is derived from the total harmonic distortion THD of 60.75%, thereby satisfying the regulation value of IEC-1000-3-2. Although the transformer T used in the case has a capacity of only about 5 W, which is the same capacity as that of the choke coil used in the conventional choke input type circuit, the power factor is improved by more than 10a.

Figure 15:
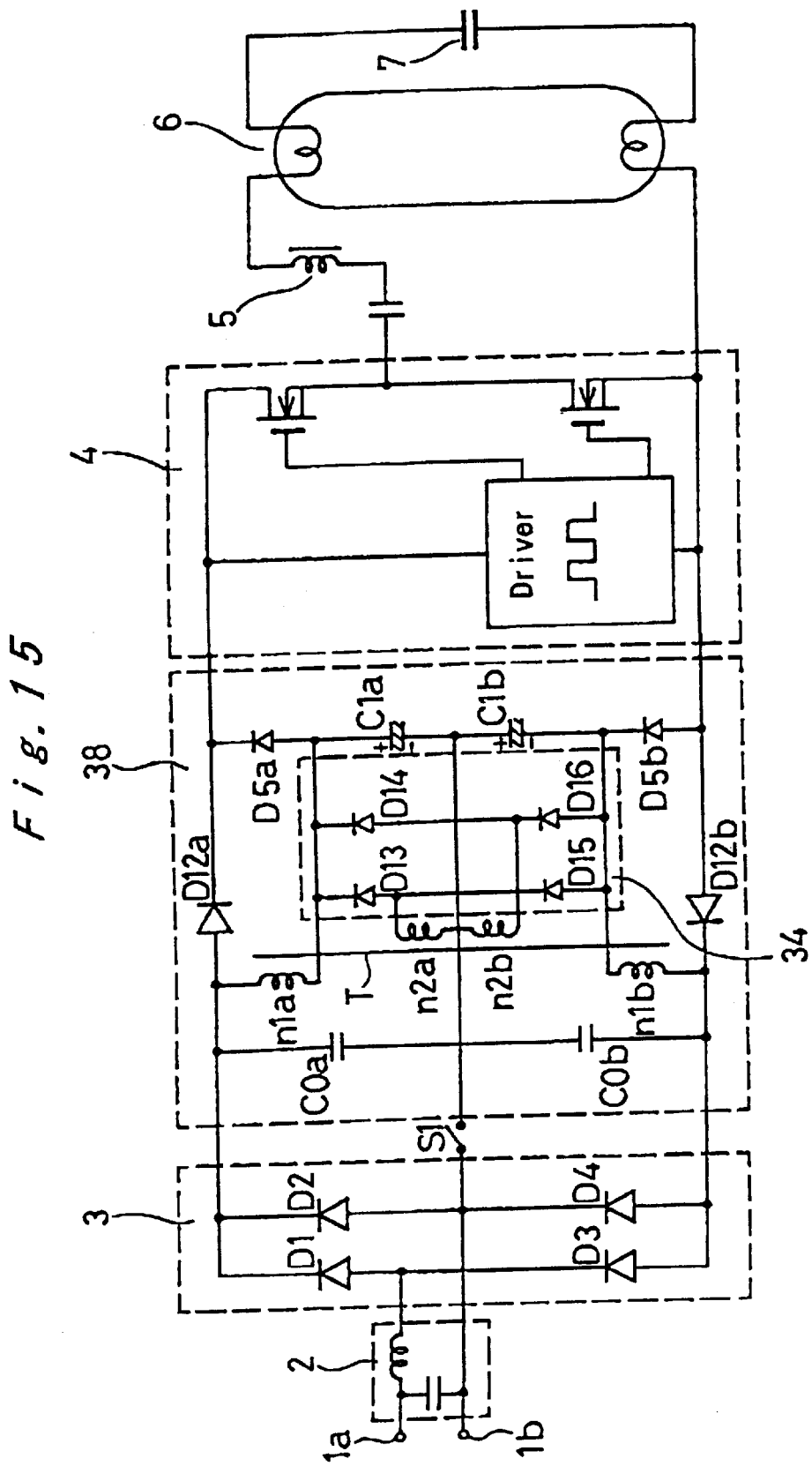
FIG. 15 is a circuit diagram illustrating an example of an application where the power factor improving circuit of the invention shown in FIG. 13 is shared by an input voltage 100-V and 200-V system of the lighting circuit.

FIG. 15 illustrates an example of an application where the power factor improving circuit 33 of the invention used in the lighting circuit shown in FIG. 13 is shared by input voltage 100-V and 200-V systems.

The power factor improving circuit 38 of the invention in the lighting circuit shown in FIG. 15 comprises a transformer T having primary windings n1a and n1b and secondary windings n2a and n2b, an auxiliary charging single-phase bridge rectifier 34, two discharging diodes D5a and D5b, diodes 12a and 12b, and smoothing capacitors C1a and C1b.

The discharging diodes D5a and D12a, of which each of the cathodes is commonly connected, are connected in parallel to the primary winding n1a of the transformer T, and the discharging diodes D5b and D12b, of which each of the anodes is commonly connected, are connected in parallel to the other primary winding n1b of the transformer T.

A plus DC terminal and a minus DC terminal of the auxiliary charging single-phase bridge rectifier 34 are connected to a plus pole terminal of the smoothing capacitor C1a and a minus pole terminal of the smoothing capacitor C1b, respectively.

Further, the high-frequency bypass capacitors C0a and C0b are connected in parallel between output terminals of the single-phase bridge rectifier circuit 3.

A switch S1 for switching over the circuit between input voltage 100-V and 200-V systems is provided between an input terminal between the diodes D2 and D4 in the single-phase bridge rectifier circuit 3, on the one hand, and a connecting point between the smoothing capacitors C1a and C1b, on the other hand.

The 100-V/200-V power factor improving circuit 38 of the invention shown in FIG. 15 similarly as in the power factor improving circuit 33 shown in FIG. 13, largely improves the power factor.

Figure 16:
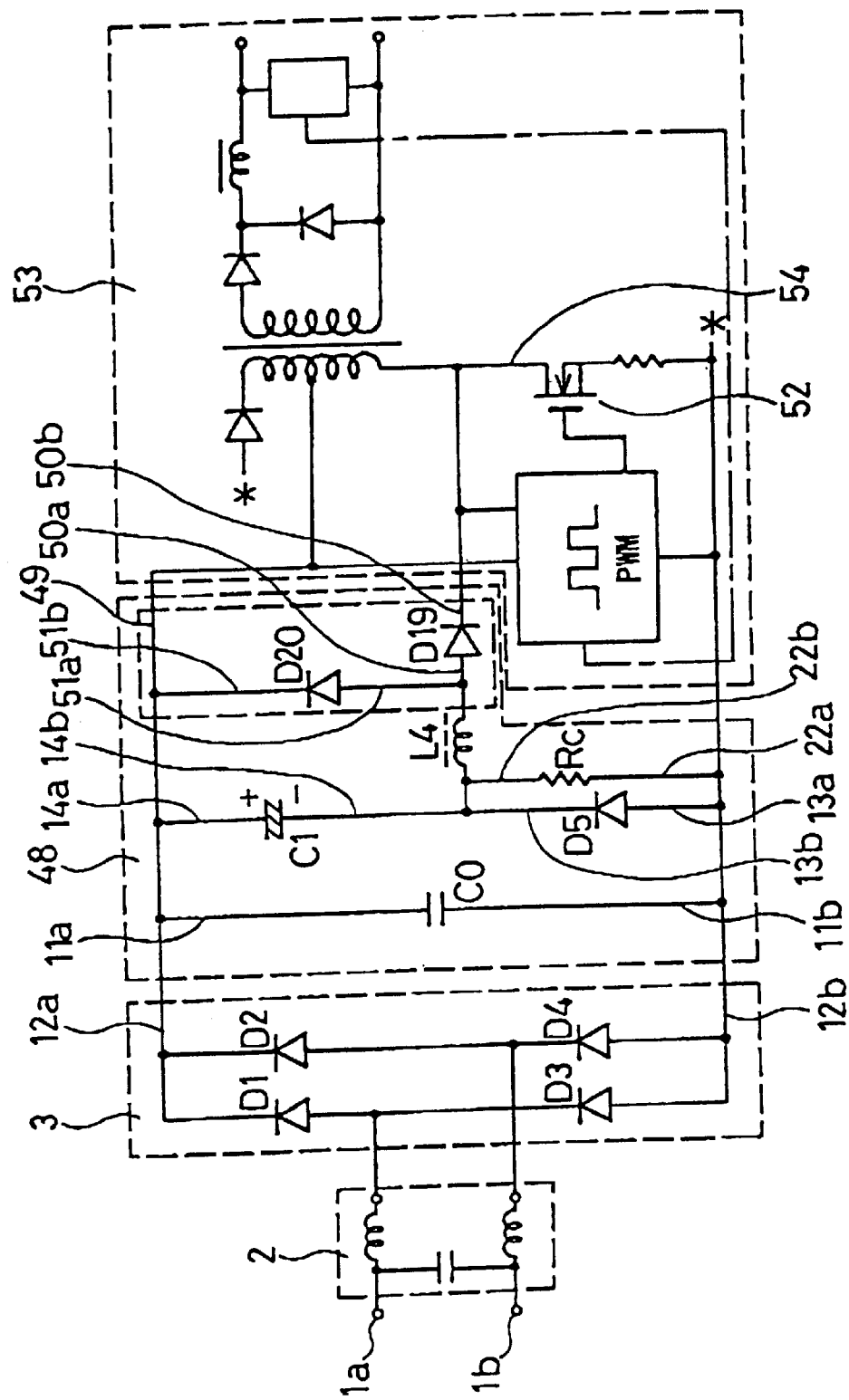
FIG. 16 is a circuit diagram illustrating another example of the power factor improving circuit of the present invention.

FIG. 16 illustrates another example of the power factor improving circuit of the invention.

The power factor improving circuit 48 of the invention shown in FIG. 16 is provided between the output side of a known single-phase bridge rectifier circuit 3 and the input side of a monolithic DC-DC converter 54, and comprises a discharging diode D5, a smoothing capacitor C1, a charging resistance Rc, a smoothing inductor L4, and a half-wave rectifier with a fly-wheel diode 49. Further, a high-frequency bypass capacity C0 is connected in parallel between the output terminals 12a and 12b of the single-phase bridge rectifier circuit 3.

More specifically in this case, the discharging diode D5 and the smoothing capacitor C1 are mutually connected in series through the connection of an output terminal 13b of the discharging diode D5 to a minus pole terminal 14b of the smoothing capacitor C1, and are connected in parallel between the plus output terminal 12a and the minus terminal 12b of the single-phase bridge rectifier circuit 3.

A charging resistance Rc is connected in parallel to this discharging diode D5 through a connection of terminals 22a and 22b of the charging resistance Rc to the input terminal 13a and the output terminal 13b of the discharging diode D5, respectively.

In the half-wave rectifier with a fly-wheel diode 49, D19 is a half-wave rectifying diode, and D20 is a fly-wheel diode. The respective anode input terminal 50a and anode input terminal 51a are common-connected.

This half-wave rectifier with a fly-wheel diode 49 is connected between a drain terminal of a transistor 52 in a monolithic DC-DC converter 53 and the minus pole terminal 14b of the smoothing capacitor C1.

In addition, a smoothing inductor L4 is connected in series between an input terminal of the half-wave rectifier with a fly-wheel diode 49, i.e., an input terminal 50a of the half-wave rectifying diode D19, and the minus pole terminal 14b of the smoothing capacitor C1.

Since the monolithic DC-DC converter 53 is provided with only one transistor 52, the half-wave rectifier 49 for high frequency incorporated in the power factor improving circuit 48 of the invention has a high impedance upon switching off and is operable only upon switching on, and thus the power factor improving circuit 48 of the invention reduces the harmonic current component and improves the power factor even in a circuit having a monolithic DC-DC converter 53.

Figure 17:
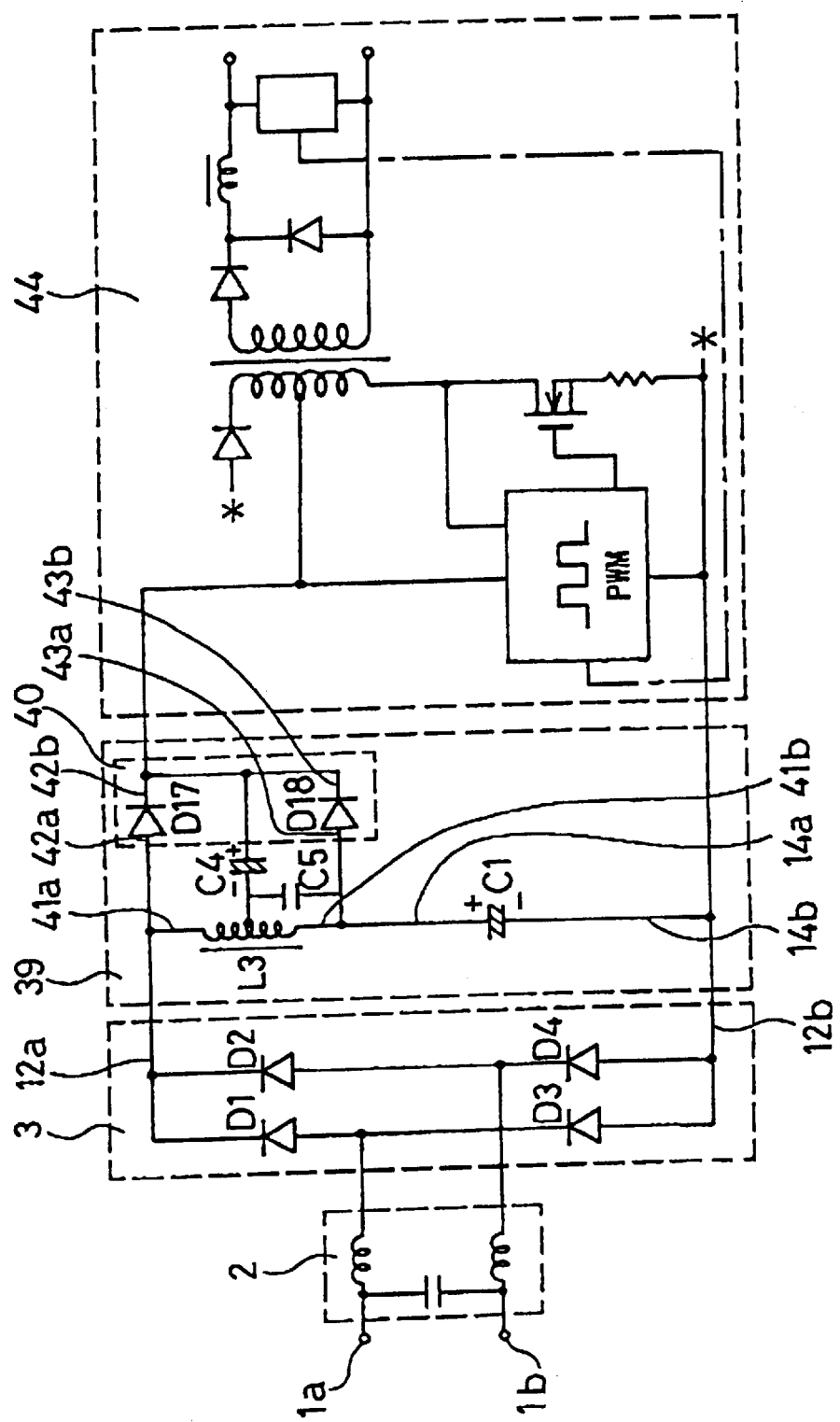
FIG. 17 is a circuit diagram illustrating further another example of the power factor improving circuit of the present invention.

FIG. 17 illustrates another embodiment of the power factor improving circuit of the present invention.

The power factor improving circuit 39 of the invention shown in FIG. 17 is provided on the output side of a single-phase bridge rectifier circuit 3, and has an inductor L3 having a mid-point tap, a two-phase half-wave auxiliary rectifier 40 comprising diodes D17 and D18, an auxiliary smoothing capacitor C4 having a low dielectric strength and a large capacity, a smoothing capacitor C1, and a parallel-resonant capacitor C5 parallel-resonating at a frequency twice or near twice as high as the source frequency.

A minus pole terminal 14b of the smoothing capacitor C1 and a minus output terminal 12b of the single-phase bridge rectifier 3 are connected as common terminals, and the inductor L3 is connected between a plus pole terminal 14a of the smoothing capacitor C1 and a plus output terminal 12a of the single-phase bridge rectifier circuit 3. Two input terminals of the two-phase half-wave auxiliary rectifier 40, i.e., an anode input terminal 42a of the diode D17 and an anode input terminal 43a of the diode D18, are connected to both ends of the inductor L3, i.e., a terminal 41a and a terminal 41b, respectively. The auxiliary smoothing capacitor C4 is connected in series between the mid-point tap of the inductor L3 and a cathode common terminal in the two-phase half-wave auxiliary rectifier 40, i.e., the cathode output terminals 42b and 43b, respectively, of the diodes D17 and D18, and in FIG. 16, its minus pole is connected to the mid-point tap and its plus pole is connected to the cathode common terminal.

Further, the parallel-resonant capacitor C5 is connected between the mid-point tap of the inductor L3 and the plus pole terminal 14a of the smoothing capacitor. This capacitor CS serves also as a capacitor for high-frequency bypass.

And, a load 44 is connected to an output terminal of the two-phase half-wave auxiliary rectifier 40 and the minus terminal 14b of the smoothing capacitor C1.

In the power factor improving circuit 39 of the invention having a circuit configuration described above, an AC voltage generated at both ends of the inductor L3 having the mid-point tap is two-phase half-wave rectified through the diodes D17 and D18 of the two-phase half-wave auxiliary rectifier 40. Then, a DC voltage is generated by the auxiliary smoothing capacitor C4 having a low dielectric strength and a large capacity, and this DC voltage is applied in series to voltage $V_{c1}$ of the smoothing capacitor C1 and is supplied to the load 44 such as an inverter. In order to reduce a source impedance to the load 44, an impedance of the parallel-resonant capacitor C5 inserted into the mid-point tap of the inductor L3 and the plus terminal 14a of the smoothing capacitor C1 is made equal to the impedance of half the winding of the inductor L3, and a frequency of 100 Hz, upon full-wave rectification (in the case of a power supply of 50 Hz) or near 100 Hz, is selected, thus making it possible to easily obtain an efficiency of 92% and a power factor of 90 to 95%.

Thus, according to the power factor improving circuit 39 of the invention shown in FIG. 17, it is possible to achieve a circuit having a high power factor and a high efficiency by only adding a few elements.

Figure 18:
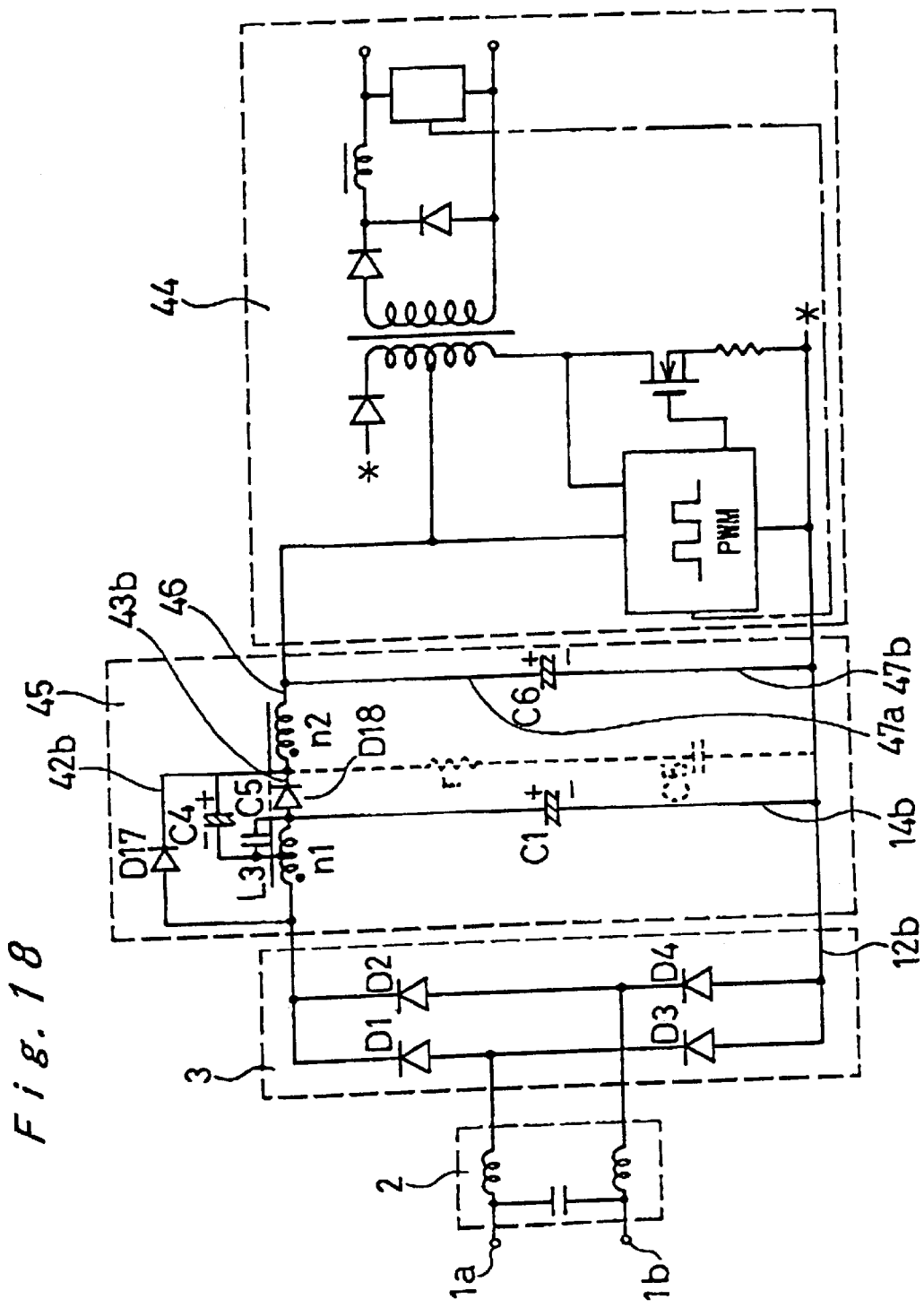
FIG. 18 is a circuit diagram illustrating further another example of the power factor improving circuit of the present invention.

FIG. 18 illustrates another embodiment of the power factor improving circuit of the present invention.

In the power factor improving circuit 45 of the invention shown in FIG. 18, a secondary winding n2 is added with the same core to the inductor L3 in the power factor improving circuit 39 shown in FIG. 17, and an auxiliary capacitor C6 is connected in parallel between the output side of this secondary winding n2 and a minus output terminal 12b of the single-phase bridge rectifier circuit 3. In FIG. 18, a plus pole terminal 47a of the auxiliary capacitor C6 is connected to an output terminal 46 of the secondary winding n2, and this minus pole terminal 47b is connected to a common-terminal of the minus output terminal 12b of the single-phase bridge rectifier circuit 3 and a minus pole terminal 14b of the smoothing capacitor C1. The other components are the same as those in the power factor improving circuit 39 shown in FIG. 17.

The power factor improving circuit 45 of the invention having a circuit configuration as described above reduces ripple contained in DC output voltage and obtains a high power factor.

And, a parallel-resonant capacitor C5 may be inserted between a cathode common terminal in the two-phase half-wave auxiliary rectifier, i.e., a cathode output terminal 43b of the diode D18 or a cathode output terminal 42b of the diode D17, on the one hand, and a common terminal of the minus output terminal of the single-phase bridge rectifier circuit 3 and the minus pole terminal 14b of the smoothing capacitor C1, on the other hand. By connecting the parallel-resonant capacitor C5 at this position, a lower-cost capacitor can be used.

Further, a resistance r may be connected in series to the parallel resonant capacitor C5, and in this case, it is possible to further reduce the harmonic current component contained in the input current waveform.

Figure 19:
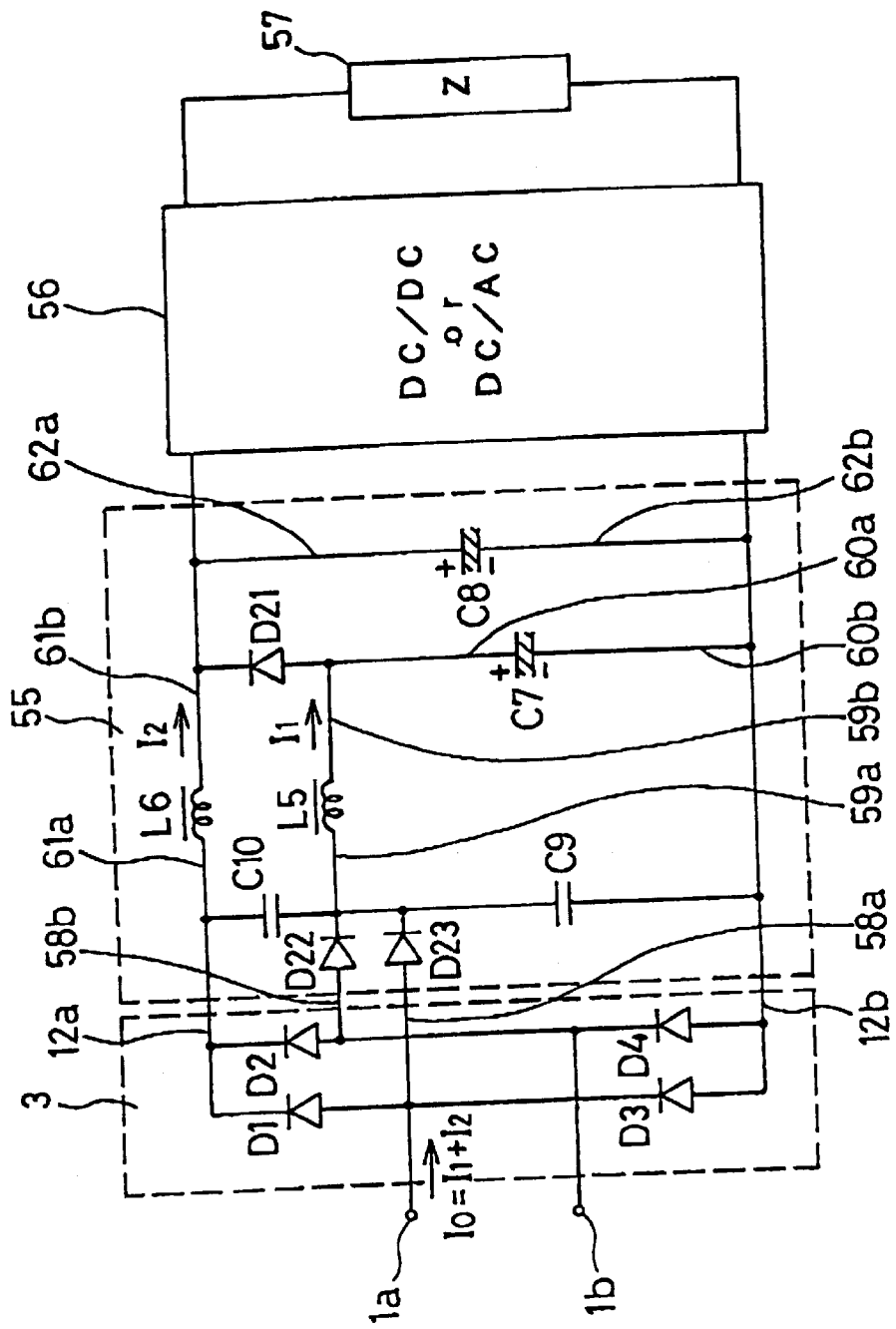
FIG. 19 is a circuit diagram illustrating further another example of the power factor improving circuit of the present invention.

FIG. 19 illustrates another embodiment of the power factor improving circuit of the present invention.

In FIG. 19, the power factor improving circuit 55 of the invention is provided between the DC output side of a known single-phase bridge rectifier circuit 3 and the input side of a DC/DC converter or a DC/AC inverter 56, and has auxiliary rectifying diodes D22 and D33, a first LC filter comprising an inductor L5, a capacitor C7, a second LC filter comprising an inductor L6 and a capacitor C8, and a discharging diode D21.

More specifically in this case, the single-phase bridge rectifier circuit 3 has, in addition to the ordinary plus output terminal 12a and the minus output terminal 12b, an auxiliary output terminal 58a taken out from a common terminal of the diodes D1 and D3 connected to the AC input terminal 1a, i.e., a connecting terminal of an anode input terminal of the diode D1 and a cathode output terminal of the diode D3, and further has an auxiliary output terminal 58b taken out from a common terminal of the diodes D2 and D4 connected to the AC input terminal 1b, i.e., the connecting terminal of an anode input terminal of the diode D2 and a cathode output terminal of the diode D4.

The anode input terminal of the auxiliary diode D23 and the anode input terminal of the auxiliary diode D22 are connected, respectively, to the auxiliary output terminal 58a and the auxiliary output terminal 58b of the single-phase bridge rectifier circuit 3. An input terminal 59a of the inductor L5 is connected to the common terminal of a cathode output terminal of the auxiliary diode D23 and a cathode output terminal of the auxiliary diode D22. A plus terminal 60a of the capacitor C7 is connected to an output terminal 59b of the inductor L5. A minus terminal 60b of the capacitor C7 and a minus output terminal 12b of the single-phase bridge rectifier circuit 3 are connected to each other. With such a configuration, a first LC filter is provided via the auxiliary rectifying diodes D22 and D23 between the auxiliary output terminals 58a/58b and the minus output terminal 12b of the single-phase bridge rectifier circuit 3.

A second LC filter is provided between the plus output terminal 12a and the minus output terminal 12b of the single-phase bridge rectifier circuit 3, an input terminal 61a of the inductor L6 and a plus output terminal 12a are connected to each other, and a minus terminal 62b of the capacitor C8 and a minus output terminal 12b are connected to each other.

Also, a discharging diode D21 is provided between a smoothing output terminal of the first LC filter and a smoothing output terminal of the second LC filter, an anode input terminal and a cathode output terminal of the discharging diode D21 are connected to the output terminal 59b of the inductor L5 of the first LC filter and the output terminal 61b of the inductor L6 of the second LC filter, respectively.

Further, a switching-noise absorbing capacitor C9 and a switching noise absorbing capacitor C10 connected in series to each other are provided to the input side of the first LC filter and the input side of the second LC filter, respectively. By the use of these switching-noise absorbing capacitors C9 and C10, a switching noise generated from the DC/DC converter or the DC/AC inverter 56 is absorbed, and thus an adverse effect on the AC input side can be eliminated.

In the power factor improving circuit 55 of the invention to which these components are connected as described above, a first rectifying and smoothing circuit is formed by the diodes D3 and D4 of the single-phase bridge rectifier circuit 3, the auxiliary rectifier diodes D22 and D23, the first LC filter, and the switching-noise absorbing capacitor C9. A second rectifying and smoothing circuit is formed by the diodes D1, D2, D3 and D4 of the single-phase bridge rectifier circuit 3, the second LC filter, and the switching noise-absorbing capacitor C10. Current of the first rectifying and smoothing circuit and current of the second rectifying and smoothing circuit are synthesized by the discharging diode D21.

In this power factor improving circuit (55), the value of the inductor L5 and the capacitor C7 of the first LC filter in the first rectifying and smoothing circuit, i.e., the LC integration, is set to a relatively large value. The LC integration of the inductor L6 and the capacitor C8 of the second LC filter in the second rectifying and smoothing circuit is set to a relatively small value such as one smaller than several fractions of the LC integration of the first LC filter, for example, a tenth. As a result of setting these LC integration values as described above, an AC input current $I_0 (=I_1+I_2)$ produced by current $I_1$ and current $I_2$ flowing through the first LC filter and the second LC filter respectively take a waveform close to a sine wave.

More particularly, the first LC filter having a large LC integration in the first rectifying and smoothing circuit requires a relatively long period of time $T_1$ for charging the capacitor C7. The second LC filter, on the other hand, having a smaller LC integration value in the second rectifying and smoothing circuit can accomplish a charging of the capacitor C8 in a time $T_2$ which is shorter than the time $T_1$.

In a conventional LC filter type rectifier circuit, i.e., a rectifier circuit provided with a single LC filter, with current from the single LC filter circuit alone, the AC input current waveform largely deviates from the sine wave, and it is difficult to inhibit a harmonic current component sufficiently. In the power factor improving circuit 55 of the invention, as described above, the AC input current $I_0$ is brought closer to the sine wave by synthesizing current $I_1$ of the first LC filter and current $I_2$ of the second LC filter having deviating time axes, thus permitting a considerable reduction of the harmonic current component.

While a power factor of about 0.75 is available from the single LC filter in the conventional case, the power factor can be remarkably improved to more than about 0.9 in the power factor improving circuit 55 of the invention.

In a conventional LC filter type rectifier circuit in which the total current of load passes through the smoothing inductor of the LC filter, the self-capacity (volt-ampere) of this smoothing inductor should be at least 20 volt-ampere per 100 W DC output (corresponding to 10 W as converted into transformer capacity), and the smoothing DC output voltage at this point ranges from 85 to 90 V per 100 V AC input.

Figure 20:
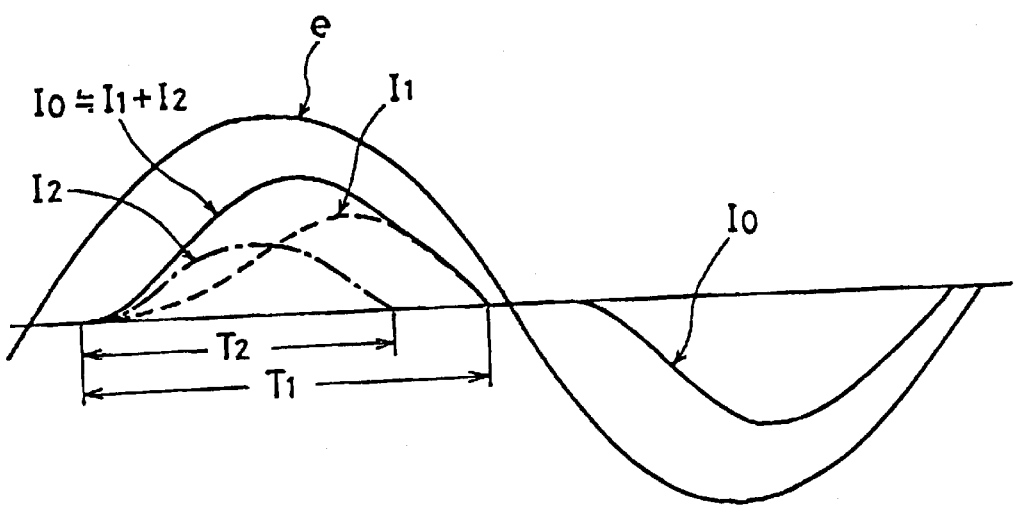
FIG. 20 is a graph schematically illustrating waveforms of an AC input voltage e, an AC input current $I_0$, a current $I_1$ flowing through the first LC filter, and a current $I_2$ flowing through the second LC filter in the power factor improving circuit shown in FIG. 19.

In contrast, in the power factor improving circuit 55 of the invention shown in FIG. 20, for example, when obtaining an input power factor of about 90%, 60% and 40% of the load current flow through the inductor L5 of the first LC filter and the inductor L6 of the second LC filter, respectively. It is therefore possible to reduce the self-capacity of the inductor L5 to about 12 volt-ampere per 100 W output, and the self-capacity of the inductor L6 to a very small capacity such as 2.5 volt-ampere per 100 W DC output (corresponding to 1.25 W as converted into a transformer capacity) because the value for the inductor L6 is smaller than that for the inductor L5 to make the charging time $T_2$ shorter than the charging time $T_1$, as shown in FIG. 20, and further there is available at this point a smoothing DC output voltage of from 115 to 125 V relative to a power factor of 0.9 at an AC input of 100 V.

Accordingly, the power factor improving circuit 55 of the present invention shown in FIG. 20 can largely improve the efficiency and the power factor, as compared with the conventional LC filter type rectifier circuit or the known choke input type rectifier circuit having an inductor inserted therein on the entry side, and does not generate noise in the radio frequency band.

Figure 21:
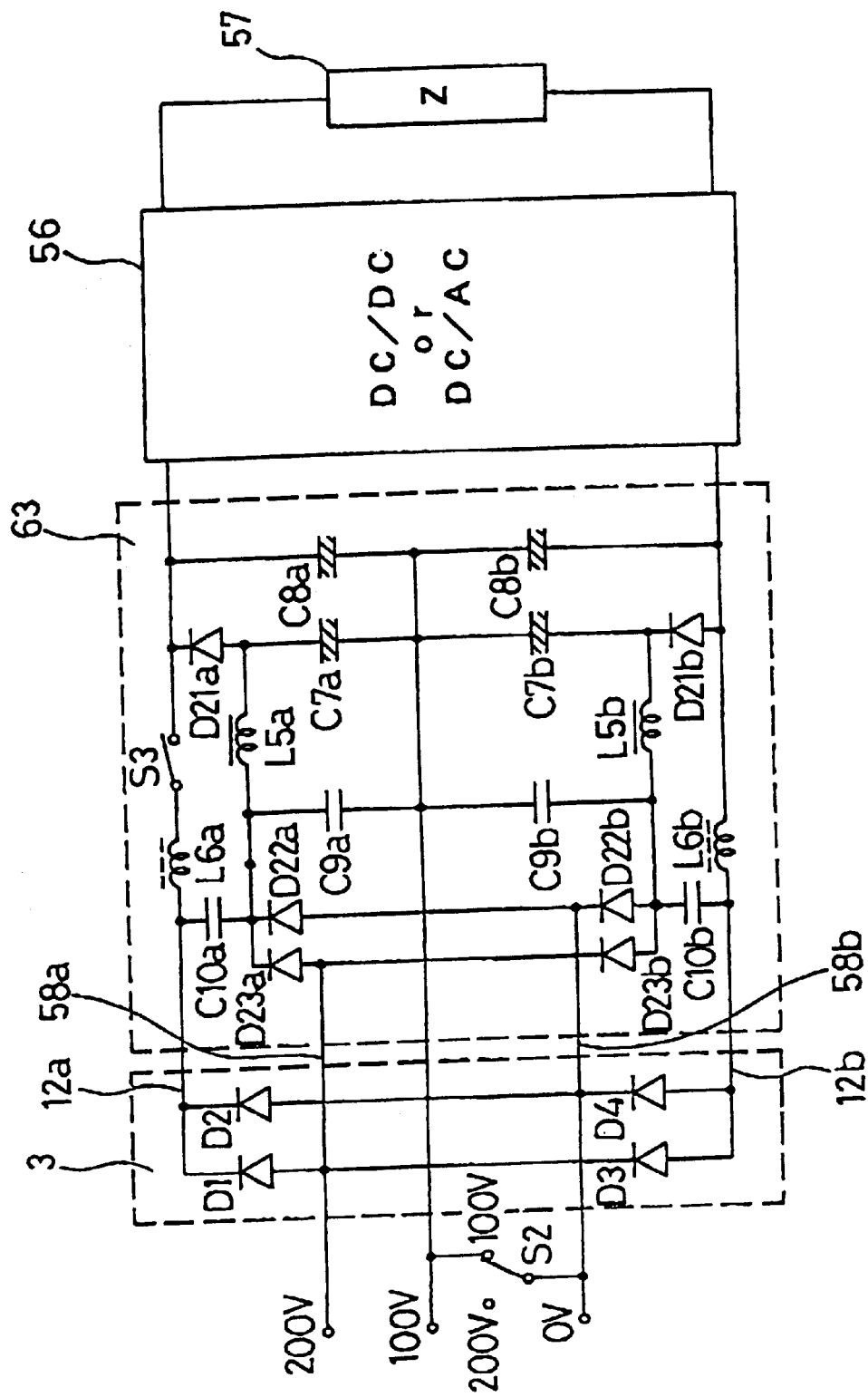
FIG. 21 is a circuit diagram illustrating an example of an application where the power factor improving circuit shown in FIG. 19 is shared by an input voltage 100-V and 200-V system.

FIG. 21 illustrates an example of application where the power factor improving circuit 55 shown in FIG. 19 is shared by input voltage 100-V and 200-V systems.

In the power factor improving circuit 63 of the invention shown in FIG. 21, each two of the components in the power factor improving circuit 55 are connected such that a first-a LC filter comprising an inductor L5a and a capacitor C7a and a first-b LC filter comprising an inductor L5b and a capacitor C7b are connected via auxiliary rectifying diodes D23a, D23b, D22a and D22b to auxiliary output terminals 58a and 58b of the single-phase bridge rectifier circuit 3.

A second-a LC filter is formed by an inductor L6a and a capacitor C8a, and a second-b LC filter is formed by an inductor L6b and a capacitor C8b. The second-a LC filter and the second-b LC filter are connected between a plus output terminal 12a and a minus output terminal 12b of the single-phase bridge rectifier circuit 3.

And, the discharging diode D21a is connected between an AC output terminal of the first-a LC filter, i.e., an output terminal of the inductor L5a, and an AC output terminal of the second-a LC filter, i.e., an output terminal of the inductor L6a. The discharging diode D21b is provided between an AC output terminal of the first-b LC filter, i.e., an output terminal of the inductor L5b, and an AC output terminal of the second-b LC filter, i.e., an output terminal of the inductor L6b.

Further, switching-noise absorbing capacitors C9a and C9b are provided on the input side of the first-a LC filter and the input side of the first-b LC filter, respectively. The switching-noise absorbing capacitors C10a and C10b are provided on the input side of the second-a LC filter and the input side of the second-b LC filter, respectively.

Between the AC input terminals, there is provided a switch S2 for switching over the circuit to correspond to an input voltage of 100 V or 200 V.

A switch S3 for selecting a connection/disconnection of the discharging diodes D21a and D21b, depending upon the 100-V or 200-V system, is provided on the output side of the inductor L6a of the second-a LC filter. In the case of an input voltage 200-V system, the circuit is switched over by this switch S3 to cause operation by any of the discharging diodes D21a and D21b, thus making it possible to reduce the harmonic component contained in the input AC current waveform.

The basic operations of the components are the same as in the power factor improving circuit 55 shown in FIG. 19.

This power factor improving circuit 63, which is an example of an application of the invention to be shared by 100-V and 200-V systems, serves as a double-voltage rectifier circuit for an input voltage of 100 V to 115 V and as a single-phase full-wave bridge rectifying and smoothing circuit for an input voltage of 200 V to 230 V, and provides an excellent power factor and efficiency just as in the power factor improving circuit 55 shown in FIG. 19.

According to the present invention, as described above in detail, there is provided a novel power factor improving circuit which permits a reduction of a harmonic current contained in the AC input current, and provides an excellent power factor and efficiency, with a simple circuit configuration and at a low cost.

Although the invention has been illustrated and described with respect to exemplary embodiments thereof, it should be understood by those skilled in the art that the foregoing and various other changes, omissions and additions maybe made therein and thereto, without departing from the spirit and scope of the present invention.

What is claimed is:

1. A power factor improving circuit provided between a rectifier circuit which converts AC voltage into DC voltage and a half-bridge-type inverter which converts DC voltage into high-frequency AC voltage, said circuit comprising:

a discharging diode, a smoothing capacitor, a charging half-bridge rectifier, a high-frequency capacitor, and a high-frequency inductor;

wherein said discharging diode and said smoothing capacitor are connected in series to each other, which are together connected in parallel between output terminals of the rectifier circuit;

wherein a plus output terminal and a minus output terminal of said charging half-bridge rectifier are connected to a plus pole and a minus pole of said smoothing capacitor, respectively; and wherein said high-frequency capacitor and said high-frequency inductor are connected in series to each other, which are together connected in series between an input terminal of said charging half-bridge rectifier and a connecting point of two transistors of the half-bridge-type inverter.

2. The power factor improving circuit according to claim 1, wherein a charging resistance or an impedance element is connected in parallel to said discharging diode.

3. The power factor improving circuit according claim 2, wherein a high-frequency bypass capacitor is connected in parallel to the rectifier circuit.

4. The power factor improving circuit according to claim 1, wherein a high-frequency bypass capacitor is connected in parallel to the rectifier circuit.

5. A power factor improving circuit provided between a rectifier circuit which converts AC voltage into DC voltage and a bridge-type inverter having a plurality of sets of transistors which converts DC voltage into high-frequency AC voltage, said circuit comprising:

a discharging diode, a smoothing capacitor, a charging bridge rectifier, a plurality of high-frequency capacitors, and a plurality of high-frequency inductors;

wherein one terminal of said smoothing capacitor and one output terminal of said charging bridge rectifier are connected in common to one output terminal of the rectifier circuit;

wherein the other terminal of said smoothing capacitor, the other output terminal of said charging bridge rectifier and one terminal of said discharging diode are connected in common to each other;

wherein the other terminal of said discharging diode is connected to the other output terminal of the rectifier circuit; and wherein one of said plurality of high-frequency capacitors and one of said plurality of high-frequency inductors are connected in series to each other, which are together connected in series between one input terminal of said charging bridge rectifier and one connecting point of the plurality of sets of transistors of the bridge-type inverter, and the other of said plurality of high-frequency capacitors and the other of said plurality of high-frequency inductors are connected in series to each other, which are together connected in series between the other input terminal of said charging bridge rectifier and the other connecting point of the plurality of sets of transistors of the bridge-type inverter.

6. The power factor improving circuit according to claim 5, wherein a charging resistance or an impedance element is connected in parallel to said discharging diode.

7. The power factor improving circuit according claim 5, wherein a high-frequency bypass capacitor is connected in parallel to the rectifier circuit.

8. A power factor improving circuit provided on an output side of a rectifier circuit which converts AC voltage into DC voltage, said circuit comprising:

a transformer having a primary winding and a secondary winding, an auxiliary charging rectifier, a discharging diode, a diode, and a smoothing capacitor;

wherein a minus pole of said smoothing capacitor is connected to a minus output terminal of the rectifier circuit;

wherein said primary winding is connected between a plus pole of said smoothing capacitor and a plus output terminal of the rectifier circuit;

wherein said discharging diode and said diode, of which the cathodes are connected in common, are connected in parallel to said primary winding;

wherein an AC terminal of said auxiliary charging rectifier is connected to said secondary winding; and wherein a plus DC terminal and a minus DC terminal of said auxiliary charging rectifier are connected to the plus pole and the minus pole of said smoothing capacitor, respectively.

9. The power factor improving circuit according claim 8, wherein a high-frequency bypass capacitor is connected in parallel to the rectifier circuit.

10. A power factor improving circuit provided between an output side of a rectifier circuit which converts AC voltage into DC voltage and an input side of a monolithic DC-DC converter which generates stabilizing DC output power, said circuit comprising:

a discharging diode, a smoothing capacitor, a charging resistance, a smoothing inductor, and a half-wave rectifier with a fly-wheel diode;

wherein said discharging diode and said smoothing capacitor are connected in series to each other, which are together connected in parallel between output terminals of the rectifier circuit;

wherein said charging resistance is connected in parallel to said discharging diode; and wherein said half-wave rectifier with said fly-wheel diode and said smoothing inductor are connected either between a collector terminal of the monolithic DC-DC converter and a minus terminal of said smoothing capacitor or between a drain terminal of the monolithic DC-DC converter and a minus terminal of said smoothing capacitor.

11. The power factor improving circuit according to claim 10, wherein an impedance element is connected in place of said charging resistance.

12. The power factor improving circuit according claim 11, wherein a high-frequency bypass capacitor is connected in parallel to the rectifier circuit.

13. The power factor improving circuit according claim 10, wherein a high-frequency bypass capacitor is connected in parallel to the rectifier circuit.

14. A power factor improving circuit provided on an output side of a rectifier circuit which converts AC voltage into DC voltage, said circuit comprising:

an inductor having a mid-point tap, a two-phase half-wave auxiliary rectifier, an auxiliary smoothing capacitor, a smoothing capacitor, and a parallel resonance capacitor which parallel-resonates at a frequency twice or near twice as large as a source frequency;

wherein one terminal of said smoothing capacitor is connected to one output terminal of the rectifier circuit;

wherein said inductor is connected between the other terminal of said smoothing capacitor and the other output terminal of the rectifier circuit;

wherein each input terminal of said two-phase half-wave auxiliary rectifier is connected to each end of said inductor;

wherein said auxiliary smoothing capacitor is connected between said mid-point tap of said inductor and a cathode common terminal of said two-phase half-wave auxiliary rectifier; and wherein said parallel resonance capacitor is connected between said mid-point tap of said inductor and the other terminal of said smoothing capacitor.

15. The power factor improving circuit according to claim 14, wherein a secondary winding is added to said inductor, and an auxiliary capacitor is connected in parallel between an output side of said secondary winding and one output terminal of the rectifier circuit.

16. The power factor improving circuit according to claim 15, wherein said parallel resonance capacitor is connected between the cathode common terminal of said two-phase half-wave auxiliary rectifier and one output terminal of the rectifier circuit.

17. The power factor improving circuit according to claim 15, wherein a resistance is connected in series to said parallel resonance capacitor.

18. The power factor improving circuit according to claim 14, wherein said parallel resonance capacitor is connected between the cathode common terminal of said two-phase half-wave auxiliary rectifier and one output terminal of the rectifier circuit.

19. The power factor improving circuit according to claim 18, wherein a resistance is connected in series to said parallel resonance capacitor.

20. The power factor improving circuit according to claim 14, wherein a resistance is connected in series to said parallel resonance capacitor.

21. A power factor improving circuit provided on an output side of a single-phase full-wave rectifier circuit which converts AC voltage into DC voltage, said circuit comprising:

a plurality of auxiliary rectifying diodes, a first LC filter having a relatively large LC product, a second LC filter having a relatively small LC product, and a discharging diode;

wherein the single-phase full-wave rectifier circuit has a plurality of auxiliary output terminals taken out from common terminals of diodes of the single-phase full-wave rectifier circuit, as well as an plus output terminal and an minus output terminal;

wherein each of the plurality of auxiliary output terminals is connected to an AC input terminal through which an AC input is to be provided;

wherein said first LC filter is connected via said plurality of auxiliary rectifying diodes between the plurality of auxiliary output terminals and the minus output terminal of the single-phase full-wave rectifier circuit;

said second LC filter is connected between the plus output terminal and the minus output terminal of the single-phase full-wave rectifier circuit; and wherein said discharging diode is connected between a smoothing output terminal of said first LC filter and a smoothing output terminal of said second LC filter.

22. The power factor improving circuit according to claim 21, wherein a switching-noise absorbing capacitor is added to each of an input side of said first LC filter and an input side of said second LC filter.

* * * * *